US012694646B2

(12) United States Patent  (10) Patent No.: US 12,694,646 B2
Oshima et al.  (45) Date of Patent: Jul. 28, 2026

(54) STATE DETECTION APPARATUS

(71) Applicant: Hitachi, Ltd., Tokyo (JP)

(72) Inventors: Takashi Oshima, Tokyo (JP); Keisuke Yamamoto, Tokyo (JP); Goichi Ono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 372 days.

(21) Appl. No.: 18/197,281

(22) Filed: May 15, 2023

(65) Prior Publication Data

US 2023/0377313 A1    Nov. 23, 2023

(30) Foreign Application Priority Data

May 18, 2022    (JP) ................................. 2022-081935
Feb. 15, 2023    (JP) ................................. 2023-021841

(51) Int. Cl.
*G06V 10/764*    (2022.01)
*G06T 5/10*    (2006.01)
*G06V 10/82*    (2022.01)

(52) U.S. Cl.
CPC .............. *G06V 10/764* (2022.01); *G06T 5/10* (2013.01); *G06T 2207/20052* (2013.01); *G06T 2207/20056* (2013.01); *G06T 2207/20084* (2013.01)

(58) Field of Classification Search
CPC .... G06V 10/764; G06V 10/431; G06V 10/58; G06V 10/62; G06V 20/52; G06V 10/82; G06T 5/10; G06T 2207/20052; G06T 2207/20056; G06T 2207/20084; G06F 18/2433
See application file for complete search history.

(56) References Cited

U.S. PATENT DOCUMENTS

| | | | | |
|---|---|---|---|---|
| 5,014,198 A | * | 5/1991 | Umemura ............... | G06T 9/007 |
| | | | | 382/250 |
| 2008/0159614 A1 | * | 7/2008 | He .......................... | G06F 18/24 |
| | | | | 382/224 |
| 2013/0108154 A1 | * | 5/2013 | Miyano ............... | G06F 18/2155 |
| | | | | 382/159 |
| 2016/0127907 A1 | * | 5/2016 | Baxley ................ | H04W 12/122 |
| | | | | 726/22 |

(Continued)

FOREIGN PATENT DOCUMENTS

| | | |
|---|---|---|
| JP | 2018-189522 A | 11/2018 |
| JP | 2020-144619 A | 9/2020 |

(Continued)

OTHER PUBLICATIONS

Office Action mailed Nov. 4, 2025 in Japanese Application No. 2023-021841.

*Primary Examiner* — Amandeep Saini
*Assistant Examiner* — Emma Rose Goebel
(74) *Attorney, Agent, or Firm* — Miles & Stockbridge, P.C.

(57) ABSTRACT

The time-series signal of the sensor is transformed to the spectral intensity by fast Fourier transform (FFT) or the like, and the one-dimensional data of the spectral intensity is generated. A pseudo image is generated, for example, by repeatedly arranging the one-dimensional data in the vertical direction, or by arranging the one-dimensional data for a plurality of sensors in the vertical direction. The state of the facility is identified by analyzing the pseudo image with an image analysis unit such as a convolutional neural network.

19 Claims, 25 Drawing Sheets

(56)     References Cited

U.S. PATENT DOCUMENTS

| | | | |
|---|---|---|---|
| 2017/0092371 A1* | 3/2017 | Harari | H10D 30/693 |
| 2018/0189943 A1* | 7/2018 | Fuse | H04N 23/60 |
| 2019/0332170 A1* | 10/2019 | Tungare | G06F 3/013 |
| 2020/0342232 A1* | 10/2020 | Yang | H04N 19/124 |
| 2021/0364450 A1* | 11/2021 | Lauber | G06T 5/60 |
| 2022/0004810 A1* | 1/2022 | Sinha | G06N 3/08 |
| 2022/0101576 A1* | 3/2022 | Kaushik | G06F 18/214 |
| 2022/0266379 A1* | 8/2022 | Yoshida | G01N 21/31 |

FOREIGN PATENT DOCUMENTS

| | | | |
|---|---|---|---|
| WO | 2021033371 A1 | 2/2021 | |
| WO | 2021033372 A1 | 2/2021 | |

* cited by examiner

*FIG. 1A*

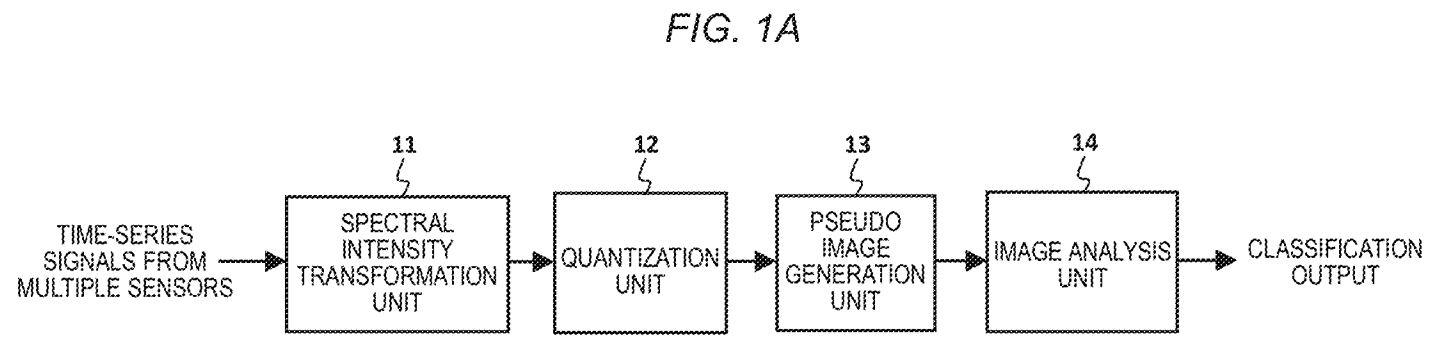

TIME-SERIES SIGNALS FROM MULTIPLE SENSORS

11

SPECTRAL INTENSITY TRANSFORMATION UNIT

12

QUANTIZATION UNIT

13

PSEUDO IMAGE GENERATION UNIT

14

IMAGE ANALYSIS UNIT

CLASSIFICATION OUTPUT

TIME-SERIES SIGNALS FROM MULTIPLE SENSORS → 11 SPECTRAL INTENSITY TRANSFORMATION UNIT → 12 QUANTIZATION UNIT → 13 PSEUDO IMAGE GENERATION UNIT → 21 CONVOLUTIONAL NEURAL NETWORK → CLASSIFICATION OUTPUT

TIME-SERIES SIGNALS FROM MULTIPLE SENSORS → 11 SPECTRAL INTENSITY TRANSFORMATION UNIT → 31 NON-LINEAR QUANTIZATION UNIT → 41 INTENSITY PROCESSING UNIT → 51 MULTIPLE PSEUDO IMAGE GENERATION UNIT → 21 CONVOLUTIONAL NEURAL NETWORK → CLASSIFICATION OUTPUT

Figure 8A:
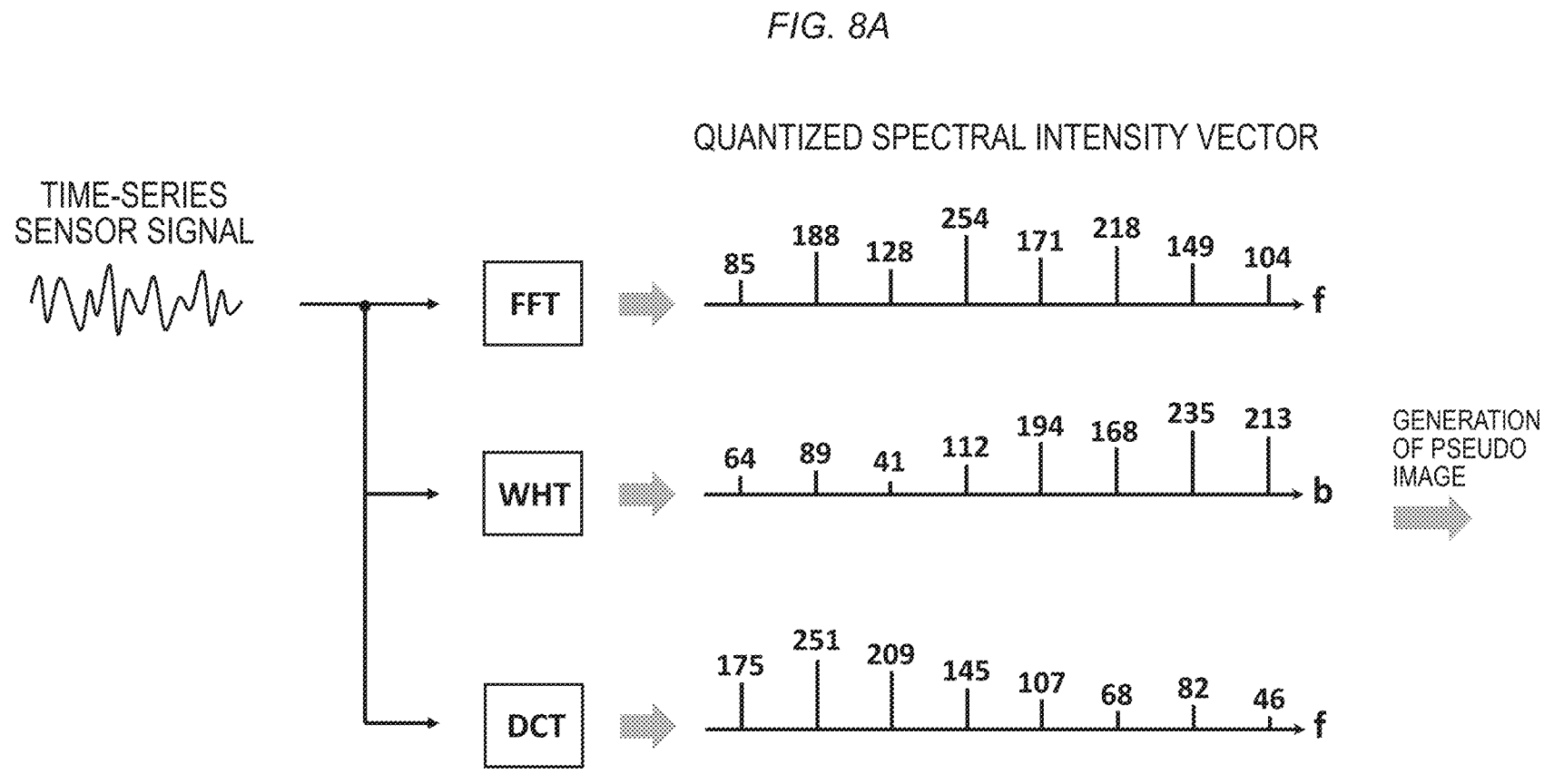

QUANTIZED SPECTRAL INTENSITY VECTOR

TIME-SERIES SENSOR SIGNAL

FFT 85 188 128 254 171 218 149 104 f

WHT 64 89 41 112 194 168 235 213 b

DCT 175 251 209 145 107 68 82 46 f

GENERATION OF PSEUDO IMAGE

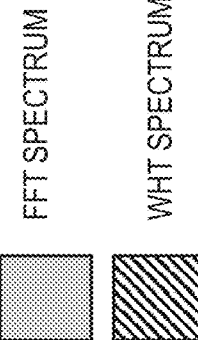
FFT SPECTRUM
WHT SPECTRUM
*FIG. 8B*
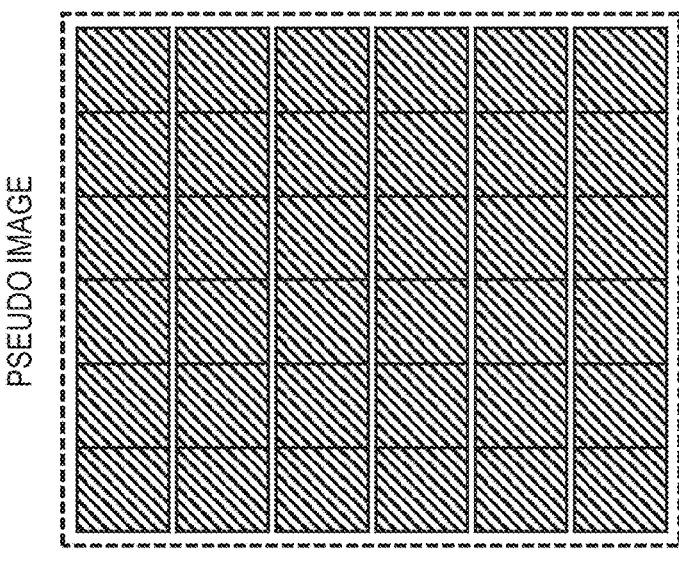
PSEUDO IMAGE
PSEUDO IMAGE

FFT SPECTRUM

WHT SPECTRUM

PSEUDO IMAGE

PSEUDO IMAGE

PSEUDO IMAGE

Figure 9B:
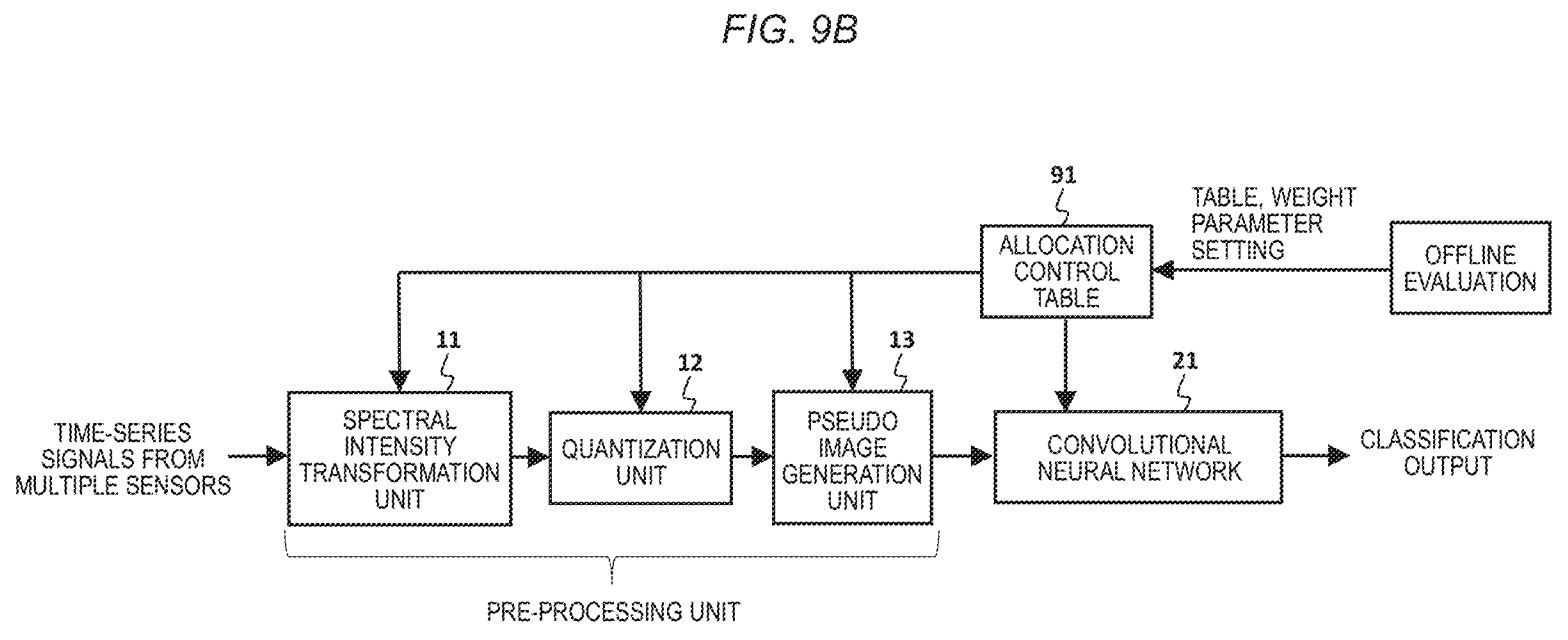

OFFLINE EVALUATION

TABLE WEIGHT PARAMETER SETTING

ALLOCATION CONTROL TABLE — 91

CONVOLUTIONAL NEURAL NETWORK — 21

CLASSIFICATION OUTPUT

PSEUDO IMAGE GENERATION UNIT — 13

QUANTIZATION UNIT — 12

SPECTRAL INTENSITY TRANSFORMATION UNIT — 11

PRE-PROCESSING UNIT

TIME-SERIES SIGNALS FROM MULTIPLE SENSORS

STATE DETECTION APPARATUS

BACKGROUND OF THE INVENTION

1. Field of the Invention

The present invention relates to state detection apparatus.

2. Description of Related Art

The aging of infrastructure facilities and plant facilities is progressing and the maintenance and management are an important social issue. As a result, there is a growing demand for automatic monitoring technology for facilities. Accordingly, in recent years, as an example, a system for detecting appearance abnormalities (scratches, cracks and the like) in a facility is being put into practical use by performing image recognition AI processing on camera images, satellite images, and the like.

However, in the method using only the image, the problem is that there is a limitation of the detection due to the resolution constraint of the image and that only the abnormality of the appearance can be understood. A technology that can detect the state of a facility with high accuracy and reliability by analyzing the time-series signals of various sensors added to or arranged in the vicinity of the facility is desired.

However, the analysis of time-series signals in the related art requires that a dedicated analysis algorithm be manually created according to the type of sensor, the characteristics of the signal, the type of the state to be detected, and the like. As a result, it was not easy to build a system in a short period of time and at low cost.

On the other hand, efforts to identify the state are also known by processing the time-series signal of the sensor with AI such as deep learning. However, in general, deep learning which can handle time-series signals is not easy to train neural networks, and the fact that much time and efforts are required becomes a problem.

JP2020-144619A discloses a technology for detecting abnormalities in a facility by transforming the time-series signals of sensors into pseudo-RGB images and analyzing the images with a convolution neural network and image recognition AI using a support vector machine. The convolutional neural network extracts the feature quantity from the above image, and the support vector machine determines whether there is an abnormality (binary determination) based on the feature quantity.

JP2020-144619A enables the application of the image recognition AI, in which training is easy, by replacing the abnormality on the time-series signal to the abnormality on the image. However, in the case of sensors such as vibration sensors, since the phase of the sensor signal and the phase difference between the sensor signals have countless variations, the images to be transformed also have countless variations. Therefore, new problems have arisen to ensure the accuracy of training and the accuracy of inference.

To be easily spread in the actual field, it is necessary to be able to build a state detection system based on a low-cost edge device with limited hardware resources.

SUMMARY OF THE INVENTION

In view of the above circumstances, the present invention aims to provide state detection apparatus that can be applied to an edge device and achieve the sensor-based state detection of a facility easily and without being affected by the phase of the time-series signal of the sensor.

According to the present invention, the following state detection apparatus is provided. That is, the state detection apparatus includes a plurality of or one sensor, and a computation unit in which data detected by the sensor is output, in which the computing unit includes processing apparatus for executing the data processing. The processing apparatus then transforms the digitized time-series signal data of the plurality of sensors into data relating to spectral intensity, generates a pseudo image based on the data relating to the spectral intensity, analyzes the pseudo image, and outputs the classification result of the state of the facility.

According to the present invention, provided is state detection apparatus that can be applied to an edge device and achieve the sensor-based state detection of a facility easily and without being affected by the phase of the time-series signal of the sensor. Note that problems, configurations, and effects other than those described above are clarified by the descriptions of the following embodiments for carrying out the invention.

BRIEF DESCRIPTION OF THE DRAWINGS

Figure 1B:
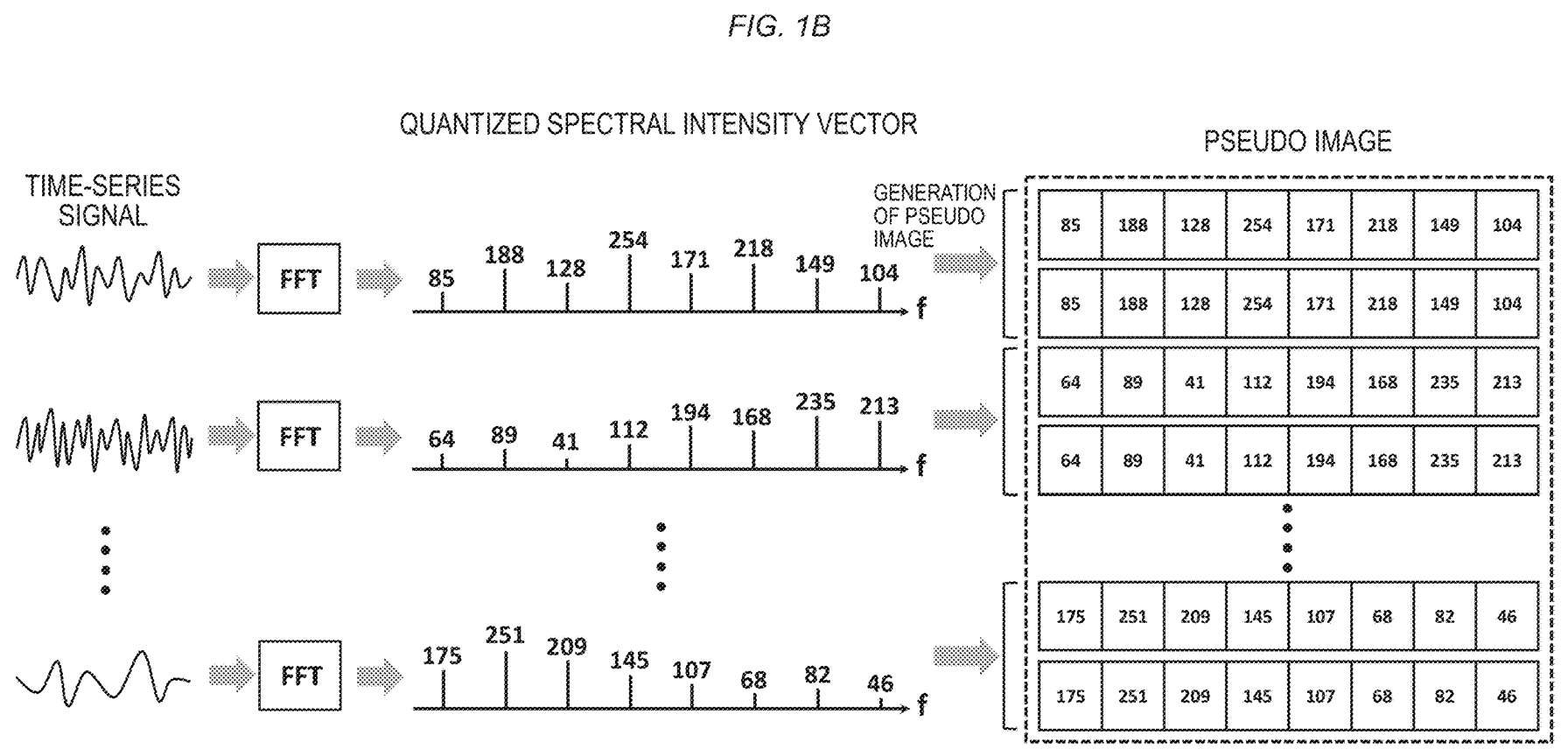

FIG. 1A is a diagram illustrating a configuration example of state detection apparatus according to a first embodiment;

FIG. 1B is a diagram illustrating in detail an example of a pseudo image generation process according to the first embodiment;

FIG. 2A is a diagram illustrating a configuration example of state detection apparatus according to a second embodiment;

FIG. 2B is a diagram illustrating an example of a convolutional neural network used in the second embodiment;

FIG. 3A is a diagram illustrating a configuration example of state detection apparatus according to a third embodiment;

FIG. 4B is a diagram illustrating an example of a pseudo image generation process using an intensity processing unit;

FIG. 4C is a diagram illustrating an example of a pseudo image generation process using the intensity processing unit;

FIG. 5A is a diagram illustrating a configuration example of state detection apparatus according to a fifth embodiment;

FIG. 6A is a diagram illustrating a configuration example of state detection apparatus according to a sixth embodiment;

FIG. 8A is a diagram illustrating an example of a pseudo image generation process according to an eighth embodiment;

FIG. 8B is a diagram illustrating an example of a pseudo image;

FIG. 9A is a diagram illustrating a configuration example of state detection apparatus according to a ninth embodiment;

FIG. 9B is a diagram illustrating a configuration example of state detection apparatus according to the ninth embodiment;

FIG. 10 is a diagram illustrating an example of a system configuration according to a tenth embodiment; and FIG. 11 is a diagram illustrating an example of a hardware configuration of state detection apparatus.

DESCRIPTION OF EMBODIMENTS

Figure 1C:
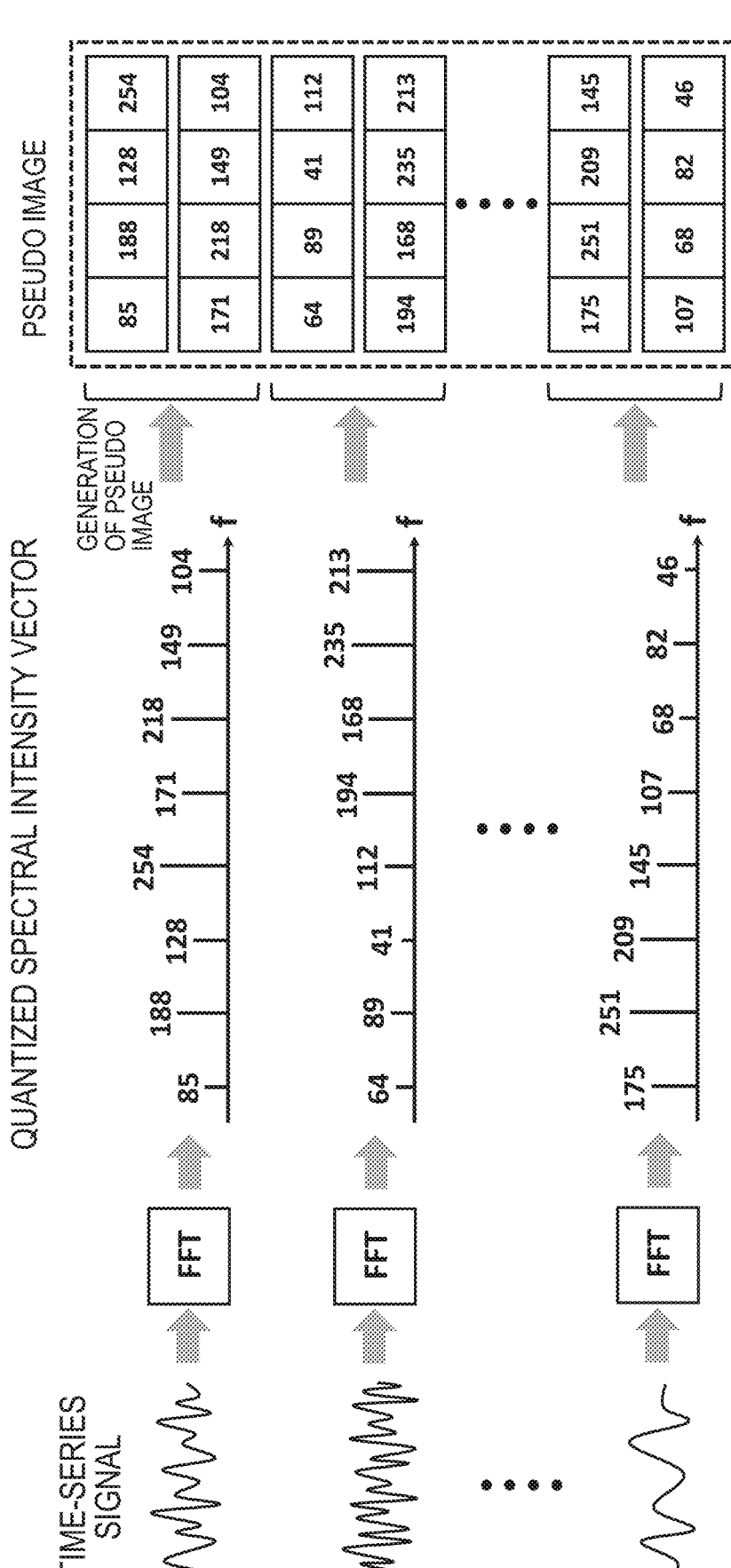
FIG. 1C is a diagram illustrating in detail an example of a pseudo image generation process according to the first embodiment.

Hereinafter, embodiments of the present invention will be described with reference to the drawings. Embodiments are examples for describing the present invention and are omitted and simplified for clarity of the description, as appropriate. The present invention can be implemented in a variety of other embodiments.

When there are a plurality of components with the same or similar functions, different subscripts may be attached to the same reference numeral to describe the components. If the plurality of components do not need to be distinguished, the description may be made with the subscripts omitted.

In embodiments, the processing performed by executing a program may be described. Here, a computer executes a program by a processor (for example, a CPU, a GPU) and performs the processing defined by the program while using storage resources (for example, memory) or interface devices (for example, communication ports), and the like. Therefore, the main body of the processing performed by executing the program may be a processor. Similarly, the main body of the processing performed by executing the program may be a controller, apparatus, system, computer, node having a processor.

The program may be installed on the computer from a program source. The program source may be, for example, a program distribution server or a computer-readable storage medium. If the program source is a program distribution server, the program distribution server may include a processor and a storage resource to store the program to be distributed, and the processor of the program distribution server may distribute the program to be distributed to other computers. In an embodiment, two or more programs may be implemented as one program, or one program may be implemented as two or more programs.

First Embodiment

The present invention is related to a technology for automatically detecting the state of a facility or the like from sensor signals, and can contribute to solving social issues such as maintenance and management of infrastructure facilities. Then, according to the present invention, it is possible to achieve an image recognition-based state detection that is not affected by the phase of the sensor signal and is suitable for automation and hardware weight reduction. A configuration example of a first embodiment of the present invention will be illustrated in FIG. 1A. A time-series signal is output from each of the plurality of sensors for monitoring the state of the facility. The time-series signals are either already digitized at the sensor output stage or digitized by the A/D converter in the subsequent stage of the sensor.

The digitized time-series signals are input to a spectral intensity transformation unit 11. The spectral intensity transformation unit 11 transforms each of the digitized time-series signals into a vector with respect to the frequency spectral intensity by, for example, a discrete Fourier transform or a fast Fourier transform (FFT).

That is, the digitized time-series signal is transformed to the information of the complex component I+j*Q at each frequency position by the discrete Fourier transform or FFT, and further, the spectral intensity is calculated from the complex component by the operation of, for example, $\sqrt{(I^2 + Q^2)}$. Note that in the case of the discrete Fourier transform and fast Fourier transform, a window function may be applied, as is commonly performed. Thus, the spectral intensity at each frequency position is obtained as a spectral intensity vector. The spectral intensity vector is output by the number of sensors.

Each of the spectral intensity vectors is input to a quantization unit 12. The quantization unit 12 outputs the expression word length for the value of each element of the spectral intensity vector (that is, the value of the frequency spectral intensity), for example, 8-bit length, or the like, reduced to fit the bit depth of the pseudo image described later. Thus, the quantized spectral intensity vector is output by the number of sensors.

Each of the quantized spectral intensity vectors is input to the pseudo image generation unit 13. The pseudo image generation unit 13 treats a single quantized spectral intensity vector as one row, and generates a two-dimensional image by arranging the quantized spectral intensity vectors corresponding to each sensor in the vertical direction. Since the image is not a normal image such as a camera image, it is a pseudo image. The bit depth of the pseudo image is equal to the reduced expression word length in the quantization unit 12. By thus reducing the bit depth of the pseudo image, it is possible to reduce the calculation amount in an image analysis unit 14 of the next stage.

The pseudo image is input to the image analysis unit 14. The image analysis unit 14 regards the pseudo image as an image and classifies the image by a general image processing algorithm or an AI processing for image recognition, and outputs the classification result. This provides classification results for the state of the facility being monitored by the sensor (for example, first normal state, second normal state, first abnormal state, second abnormal state, third abnormal state and the like).

The present embodiment will be described in more detail with reference to FIG. 1B. As described above, the digitized time-series signals of each sensor are each processed by fast Fourier transform (FFT) to obtain a spectral intensity vector. Note that fast Fourier transform engines may be provided for only the number of sensors and one fast Fourier transform engine may be assigned for each sensor for processing, or a fast Fourier transform engine may be shared by a plurality of sensors and a fast Fourier transform may be performed in time division.

The spectral intensity vector is data in which the values of the frequency spectral intensities at each frequency position are arranged horizontally. The number of dimensions of the vector (that is, the number of frequency positions) is equal to half the number of points of the discrete Fourier transform or fast Fourier transform. FIG. 1B illustrates a case where the number of points is 16 and the number of dimensions of the vector is 8, but any number of points may be selected as appropriate.

The number of points determines the time width of the sensor signal used to generate each pseudo image. That is, the time width is equal to the product of the time interval and the number of points of the digitized time-series signal. The frequency resolution (the interval of each frequency position) is equal to the reciprocal of the time width.

FIG. 1B illustrates the spectral intensity vector quantized at 8 bits, for example, in the quantization unit 12. Since it is 8 bits, it is expressed as an integer value from 0 to 255. Therefore, quantization (that is, reduction to 8-bit word length) may be performed after normalizing the frequency spectral intensity to fit this range. In FIG. 1B, the quantized spectral intensity vector corresponding to a first sensor is shown as (85, 188, 128, 254, 171, 218, 149, 104). The quantized spectral intensity vector corresponding to a second sensor is (64, 89, 41, 112, 194, 168, 235, 213).

When generating the pseudo image, the pseudo image generation unit 13 treats the quantized spectral intensity vectors as one row and arranges the vectors in the vertical direction. However, as illustrated in FIG. 1B, the quantized spectral intensity vectors corresponding to one sensor may be treated as a plurality of rows and repeatedly arranged. In FIG. 1B, the quantized spectral intensity vectors are arranged repeatedly two times. That is, the quantized spectral intensity vectors corresponding to the first sensor are arranged in the first and second rows of the pseudo image, and the quantized spectral intensity vectors corresponding to the second sensor are arranged in the third and fourth rows, and the same manner is applied subsequently to complete the pseudo image. Note that, the number of repetitions may be selected as appropriate, including once (that is, when not repeated).

Thus, the size of the width (in pixels) of the generated pseudo image is equal to the number of dimensions of the quantized spectral intensity vector (8 pixels in FIG. 1B). On the other hand, the size of the vertical width (number of pixels) is equal to the product of the number of sensors and the number of repetitions.

The pixel value of the pseudo image is the quantized frequency spectral intensity after the normalization. As such, since the pixel value of the pseudo image is equivalent to the frequency spectral intensity of the time-series signal output from the sensor, the phase of the time-series signal does not affect.

When the size of the vertical width of the pseudo image is specified, the number of sensors that can be handled by one pseudo image decreases inversely in proportion to the number of repetitions. On the other hand, since the amount of information per sensor in the pseudo image increases in proportion to the number of repetitions, classification by the image analysis unit 14 is facilitated.

FIG. 1C further complements the generation of a pseudo image in the present embodiment. In FIG. 1C, similarly to FIG. 1B, the quantized spectral intensity vectors after normalization are generated by the number of sensors. For example, the quantized spectral intensity vector corresponding to the first sensor is (85, 188, 128, 254, 171, 218, 149, 104), and the quantized spectral intensity vector corresponding to the second sensor is (64, 89, 41, 112, 194, 168, 235, 213).

However, in FIG. 1C, the horizontal width of the target pseudo image is 4 pixels, that is, half of the case of FIG. 1B. Therefore, the number of dimensions of each quantized spectral intensity vector is twice the horizontal width of the target pseudo image.

In such a case, each of the quantized spectral intensity vectors is divided into a plurality of spectral intensity sub-vectors to fit the size of the horizontal width of the pseudo image. When generating the pseudo image, the pseudo image generation unit 13 treats the spectral intensity sub-vector as one row and arranges each spectral intensity sub-vector in the vertical direction.

For example, in FIG. 1C, by dividing the quantized spectral intensity vector into two spectral intensity sub-vectors, the dimensions of the spectral intensity sub-vectors are matched to the size of the horizontal width of the pseudo image (that is, 4) as half (that is, 4).

For example, the quantized spectral intensity vector corresponding to the first sensor is divided into a first spectral intensity sub-vector (85, 188, 128, 254) and a second spectral intensity sub-vector (171, 218, 149, 104). The quantized spectral intensity vector corresponding to the second sensor is divided into a third spectral intensity sub-vector (64, 89, 41, 112) and a fourth spectral intensity sub-vector (194, 168, 235, 213).

The pseudo image generation unit 13 generates a pseudo image by arranging the first spectral intensity sub-vector in the first row, the second spectral intensity sub-vector in the second row, the third spectral intensity sub-vector in the third row, and the fourth spectral intensity sub-vector in the fourth row, and also by arranging the spectral intensity sub-vectors corresponding to the subsequent sensors from the third sensor in the same manner.

Thus, a pseudo image with a target horizontal width size (number of pixels) of 4 can be generated. The size (number of pixels) of the vertical width of the generated pseudo image is the product of the number of divisions and the number of sensors.

Note that it is also possible to combine the repetitions described in FIG. 1B. That is, each of the spectral intensity sub-vectors may be repeatedly arranged in a plurality of rows. For example, when the number of repetitions is 4, the first spectral intensity sub-vector is repeatedly arranged from the first row to the fourth row, the second spectral intensity sub-vector is repeatedly arranged from the fifth row to the eighth row, the third spectral intensity sub-vector is repeatedly arranged from the ninth row to the twelfth row, and the fourth spectral intensity sub-vector is repeatedly arranged from the thirteenth row to sixteenth rows, to generate a pseudo image. Here, the size (number of pixels) of the vertical width of the generated pseudo image is the product of the number of repetitions and the number of divisions and the number of sensors.

In FIG. 1B and FIG. 1C, the quantized spectral intensity vectors and the spectral intensity sub-vectors may be arranged in any order other than the above, as appropriate, when generating a pseudo image by arranging the quantized spectral intensity vectors and the spectral intensity sub-vectors.

If the number of sensors is small, the digitized time-series signal of one sensor may be used as the output of the other sensors, and a pseudo image may be generated in the above procedure. For example, the digitized time series signal of the first sensor is treated as the digitized time-series signal of the first sensor and the second sensor, respectively, and the digitized time-series signal of the second sensor is treated as the digitized time-series signal of the third sensor and the fourth sensor, and the like.

Each of the above operations may be performed using a dedicated circuit (accelerator), or may be performed by software processing by using a general-purpose processor such as a CPU.

As described above, according to the present embodiment, the state of the facility being monitored by the sensor can be classified by image analysis without being affected by the phase of the time-series signal output from the sensor. In image analysis, various techniques have been known until now, and high-precision classification can be executed even in light-weight algorithms by selecting a technique as appropriate. There is also open source software (OSS) for image analysis. Therefore, according to the present embodiment, it is believed that the sensor-based state detection of a facility can be achieved easily and with high accuracy and reliability by applying an edge device.

Second Embodiment

Figure 2A:
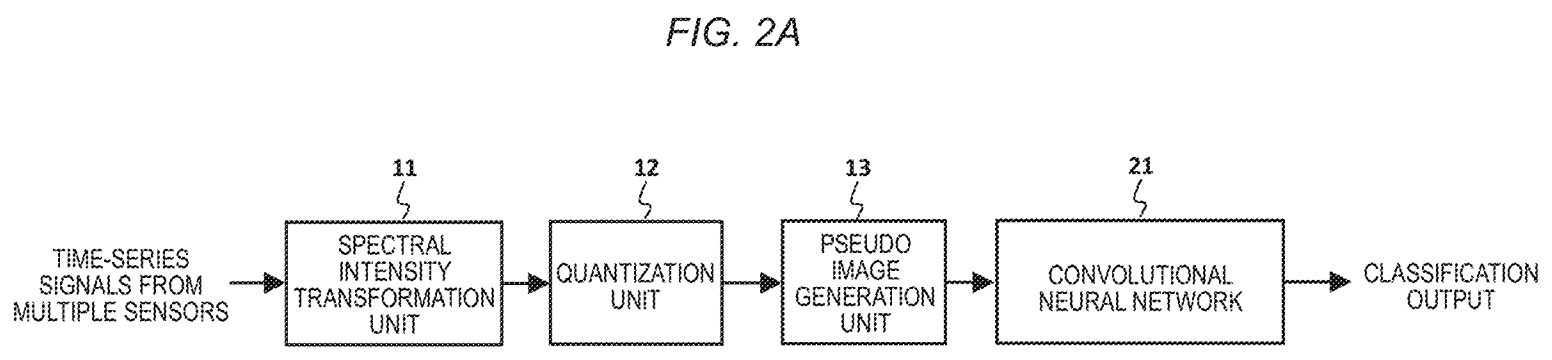

A configuration of a second embodiment of the present invention will be illustrated in FIG. 2A. In the present embodiment, a convolution neural network 21 is applied as the image analysis unit 14 in the first embodiment. Since the operations up to the pseudo image generation unit 13 are described in FIGS. 1A, 1B, and 1C, the description will be omitted.

Figure 2B:
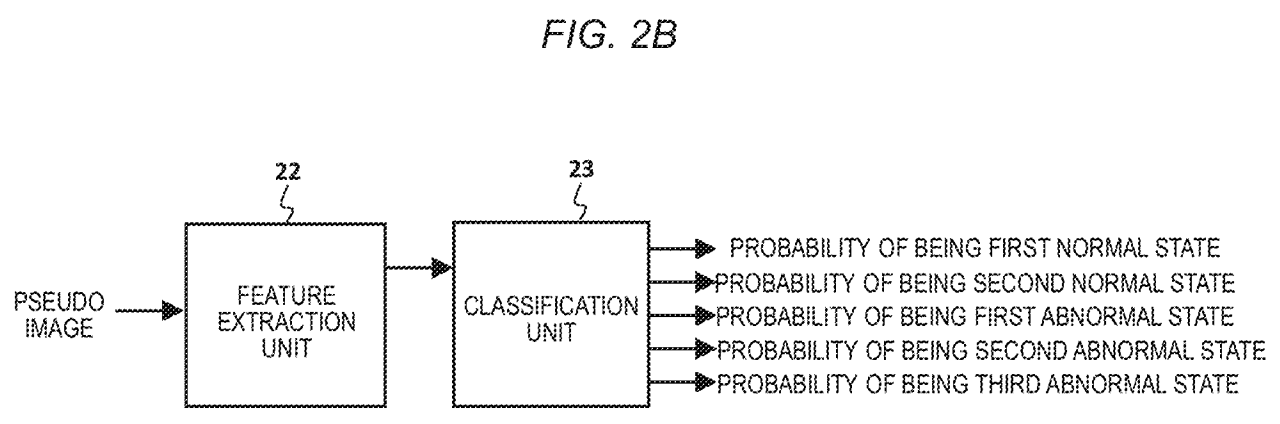

The pseudo image output from the pseudo image generation unit 13 is input to the convolutional neural network 21. The configuration of the convolutional neural network 21 is illustrated in FIG. 2B. The convolutional neural network 21 applies a class classification type.

Similar to a general class classification type convolutional neural network, a feature extraction unit 22 and a classification unit 23 subsequent thereto are provided. The feature extraction unit 22 is composed of a number of layers and performs feature extraction for the input pseudo image.

The classification unit 23 is composed of a single layer or a plurality of layers, receives the result of the feature extraction, calculates the probability that the pseudo image input to the convolutional neural network 21 belongs to each class, and outputs the probability as a classification result. For example, in FIG. 2B, the convolutional neural network 21 performs the classification of a first normal state, a second normal state, a first abnormal state, a second abnormal state, a third abnormal state of the five classes and outputs the probability of belonging to each class. Thus, the state of the facility being monitored by the sensor can be classified based on the digitized time-series signal of the sensor.

In the above, the pseudo image input to the convolutional neural network 21 is reduced in bit depth as described above. Accordingly, by performing the calculation with the reduced computational word length even in the convolutional neural network 21, the power consumption and the mounting area are reduced. Note that it is generally known that a convolutional neural network can maintain a high-precision classification capability even when the computational word length is reduced.

For parameters such as the weight of the convolutional neural network 21, the values trained in advance are used. The method of training will be described in FIG. 2C.

For example, if the classification of the five classes of the first normal state, the second normal state, the first abnormal state, the second abnormal state, and the third abnormal state is desired, digitized time-series signal data of each sensor is acquired in advance for each of the five states.

For example, when four sensors are used, the data DATA [first normal] [1] of the first sensor, the data DATA [first normal] [2] of the second sensor, the data DATA [first normal] [3] of the third sensor, and the data DATA [first normal] [4] of the fourth sensor are acquired for the first normal state.

Similarly, the data DATA [second normal] [1] of the first sensor, the data DATA [second normal] [2] of the second sensor, the data DATA [second normal] [3] of the third sensor, and the data DATA [second normal] [4] of the fourth sensor are acquired for the second normal state.

Similarly, the data DATA [first abnormal] [1] of the first sensor, the data DATA [first abnormal] [2] of the second sensor, the data DATA [first abnormal] [3] of the third sensor, and the data DATA [first abnormal] [4] of the fourth sensor are acquired for the first abnormal state.

Similarly, the data DATA [second abnormal] [1] of the first sensor, the data DATA [second abnormal] [2] of the second sensor, the data DATA [second abnormal] [3] of the third sensor, and the data DATA [second abnormal] [4] of the fourth sensor are acquired for the second abnormal state.

Similarly, the data DATA [third abnormal] [1] of the first sensor, the data DATA [third abnormal] [2] of the second sensor, the data DATA [third abnormal] [3] of the third sensor, and the data DATA [third abnormal] [4] of the fourth sensor are acquired for the third abnormal state.

Each of the data is sorted by the number of samples equal to the number of points of the discrete Fourier transform and fast Fourier transform. For example, if a pseudo image is generated by processing 1024 points by discrete Fourier transform or fast Fourier transform, each data is sorted in order by 1024 samples from the beginning. For example, data of 1024 samples sorted into the k-th in DATA [first normal] [1] is called DATA [first normal] [1][k]. Each other DATA is similar.

Figure 2C:
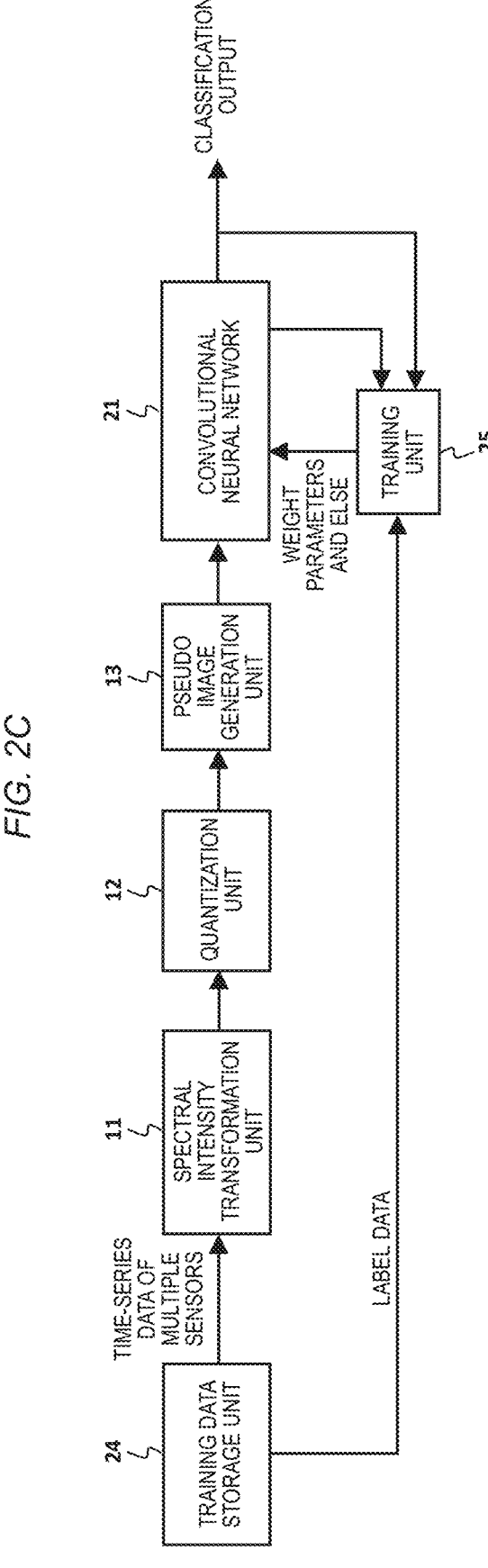
FIG. 2C is a diagram illustrating an example of a training process of a convolutional neural network used in the second embodiment.

As shown in FIG. 2C, DATA [X] [1] [Y], DATA [X] [2][Y], DATA [X] [3] [Y], DATA [X] [4] [Y] are called and output from a training data storage unit 24 during training. X is randomly selected from five states: first normal, second normal, first abnormal, second abnormal, and third abnormal. Y, which is the division number, is also randomly selected. The four pieces of DATA are data obtained at the same time from the four sensors.

Thus, the sensor 1, the sensor 2, the sensor 3, and the sensor 4 corresponding to the selected state and the selected division number, the digitized time-series signal data is simultaneously output from the training data storage unit 24. The selected state X is also output simultaneously as label data. The digitized time-series signal data of each sensor is input to the spectral intensity transformation unit 11, and thereafter, the spectral intensity transformation unit 11, the quantization unit 12, and the pseudo image generation unit 13 operate as described above, and a pseudo image for the state X is output from the pseudo image generation unit 13.

The convolutional neural network 21 classifies the pseudo images as described above and outputs the classification results. The classification result is a numerical value of the probability of belonging to each of the first normal state, the second normal state, the first abnormal state, the second abnormal state, and the third abnormal state as described above.

The classification result is input to a training unit 25. The label data indicating that the state X is also input to the training unit 25. The values of the internal nodes of the convolutional neural network 21 required for training are also provided to the training unit 25. Based on such inputs, the training unit 25 calculates the values of the weight parameters and the like used in the convolutional neural network 21 by the known algorithms.

The selection of the state X and the division number Y, and the data output from the training data storage unit 24 are sequentially performed, and the generation of the pseudo image, classification of the pseudo image, and calculation of the weight parameters based on the classification result are performed continuously for a predetermined period.

Note that calculation of the weight parameters and the like may be performed each time a pseudo image is generated and classified (that is, online training), and may be performed based on the results of generating and classifying a plurality of pseudo images (that is, batch training).

After a predetermined period of time, the training unit 25 supplies the finally obtained values of the weight parameters and the like to the convolutional neural network 21. Training is completed. The convolutional neural network 21 uses the supplied weight parameters and the like in performing the operations described in FIG. 2A. As described above, the state of a facility as described above is classified.

During the training, some or all of the operations of FIG. 2C may be executed on apparatus other than the apparatus that executes the operations of FIG. 2A. For example, the normal operation of performing the operation of FIG. 2A, that is, classification of the state of a facility, may be performed using an edge device with limited hardware resources and the training operation of FIG. 2C may be performed on a server or the like with abundant hardware resources. The operations may also be implemented and executed in a variety of ways.

As described above, according to the present embodiment, the state of the facility being monitored by the sensor can be classified using a convolutional neural network that is not affected by the phase of the time-series signal output from the sensor and executes image recognition AI. By using convolutional neural networks, image analysis algorithms corresponding to sensors are automatically acquired through the training of sensor data. A convolutional neural network is easier to train than a neural network for time-series signals and can also reduce training time. By using a convolutional neural network with reduced computational word length, the power consumption and mounting area can be reduced, and thus, the sensor can be mounted on edge devices. Therefore, according to the present embodiment, it is believed that the sensor-based state detection of a facility can be achieved easily and with high accuracy and reliability by applying an edge device.

Third Embodiment

Figure 3A:
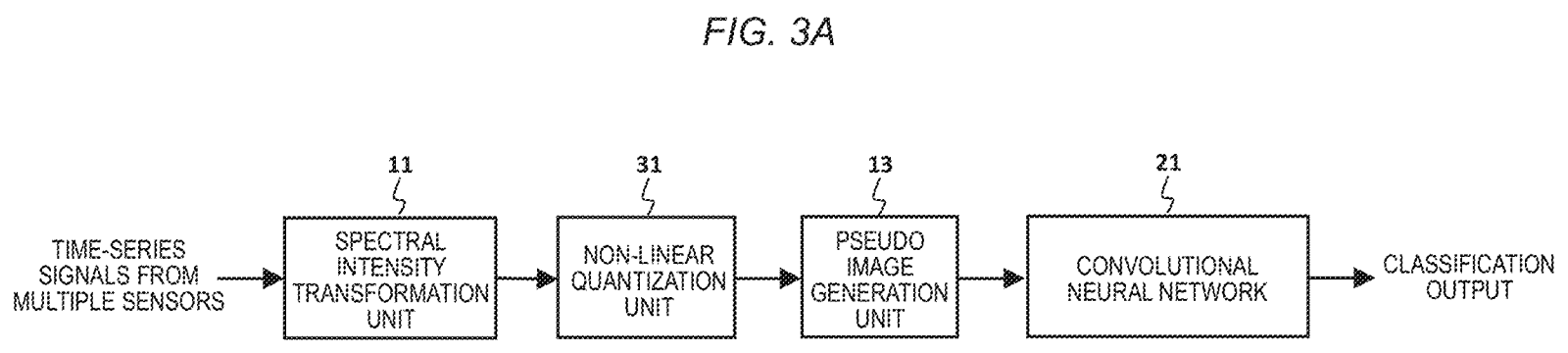
Figure 3B:
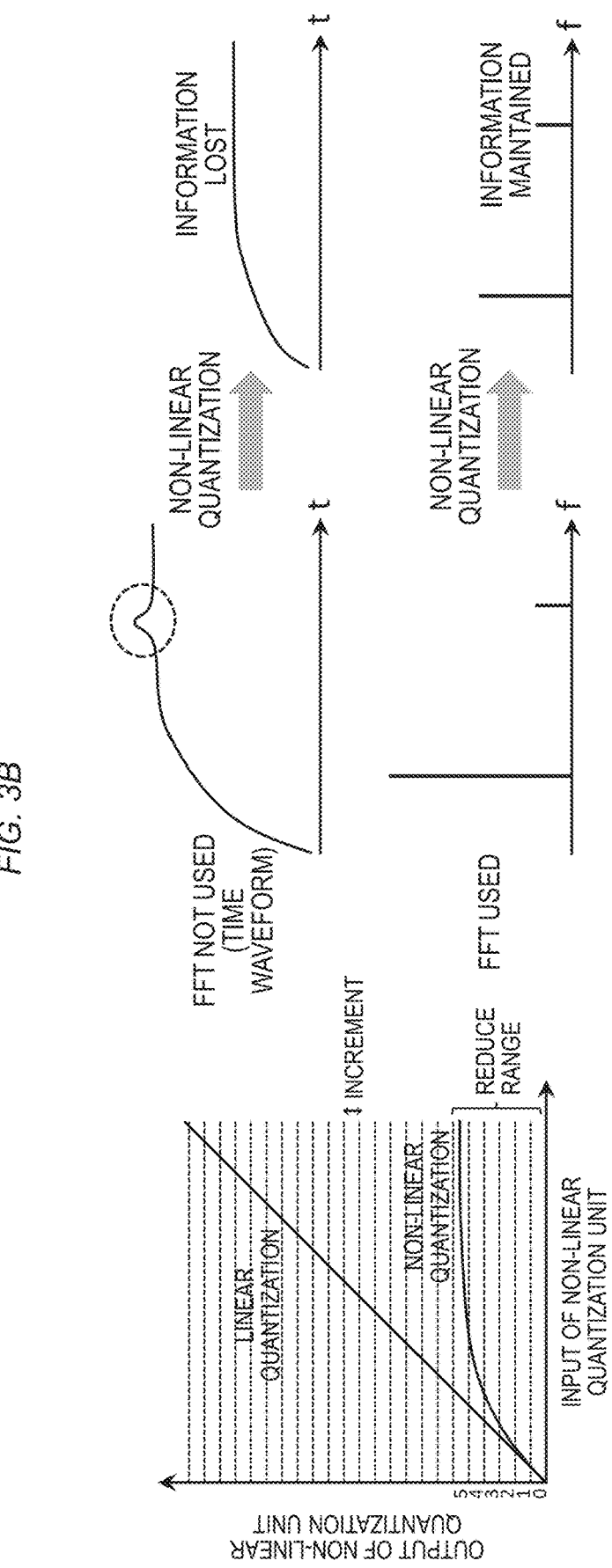
FIG. 3B is a diagram illustrating an example of the effect of non-linear quantization in state detection apparatus.

A configuration of a third embodiment of the present invention will be illustrated in FIG. 3A. In the present embodiment, a non-linear quantization unit 31 is applied as the quantization unit 12 in the second embodiment. Since the operation of the other portion is as described in the first embodiment and the second embodiment, the description thereof will be omitted. The reason why the application of the non-linear quantization unit 31 is effective will be described below with reference to FIG. 3B.

As described above, quantization is required to reduce the expression word length of the value of each element of the spectral intensity vector. When the state detection of a facility with very high accuracy is desired to be achieved, it is necessary to make the increment width of the quantization fine so that the minute information is not lost. As a result, a long expression word length is required.

Here, the non-linear quantization unit 31 is introduced in the present embodiment. The non-linear quantization unit 31 first transforms the value of each element for each of the input spectral intensity vectors, and then performs quantization (that is, expressing the reduced expression word length). As illustrated in FIG. 3B, since the saturation characteristics of the non-linear transformation can drastically reduce the value range, reduced expression word length can be applied.

Note that the non-linear quantization is established only when combined with the preceding discrete Fourier transform and fast Fourier transform (FFT). That is, as illustrated in FIG. 3B, when non-linear quantization is performed directly on the digitized time-series signal of the sensor, the saturation characteristics of the non-linear transformation result in the loss of minute components. On the other hand, as in the embodiment, since the minute components are separated by transforming the time-series signal to the information of the frequency domain by the discrete Fourier transform and fast Fourier transform (FFT), the information of the minute components is maintained even when performing the subsequent non-linear transformation.

Similar to the quantization unit 12, the non-linear quantization unit 31 outputs the quantized spectral intensity vector by the number of sensors. According to the present embodiment, in addition to the effect of the second embodiment, it is possible to achieve the state detection of a facility with even higher accuracy.

Fourth Embodiment

Figure 4A:
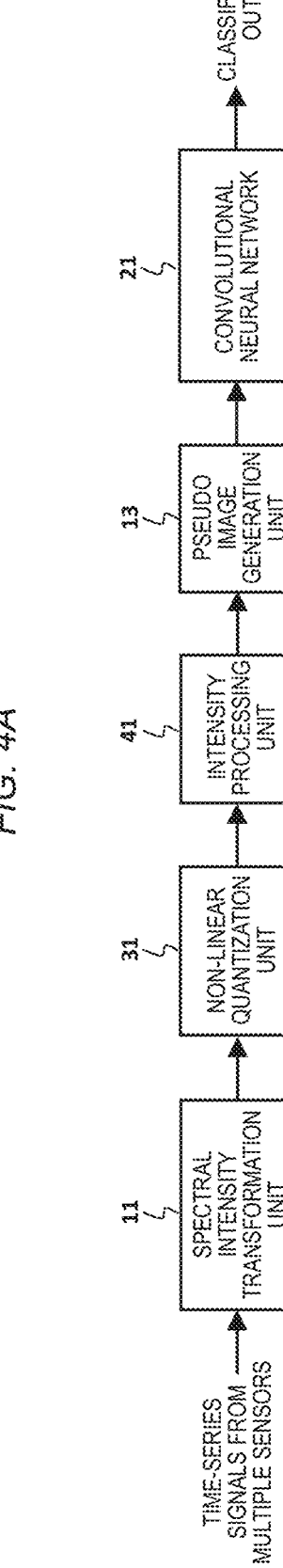
FIG. 4A is a diagram illustrating a configuration example of state detection apparatus according to a fourth embodiment.

A configuration of a fourth embodiment of the present invention will be illustrated in FIG. 4A. In the present embodiment, an intensity processing unit 41 is inserted into the subsequent stage of the non-linear quantization unit 31 in the third embodiment. Since the operation of the other portion is as described in the first embodiment, the second embodiment, and the third embodiment, the description thereof will be omitted.

The operation of the intensity processing unit 41 will be described with reference to FIG. 4B. The quantized spectral intensity vector is input to the intensity processing unit 41 from the non-linear quantization unit 31 by the number of sensors. In the intensity processing unit 41, to eliminate the effect of unnecessary components included in the sensor signal, for example, among the elements of the quantized spectral intensity vector, the element at the frequency position corresponding to the unnecessary components is set to zero.

Figure 4B:
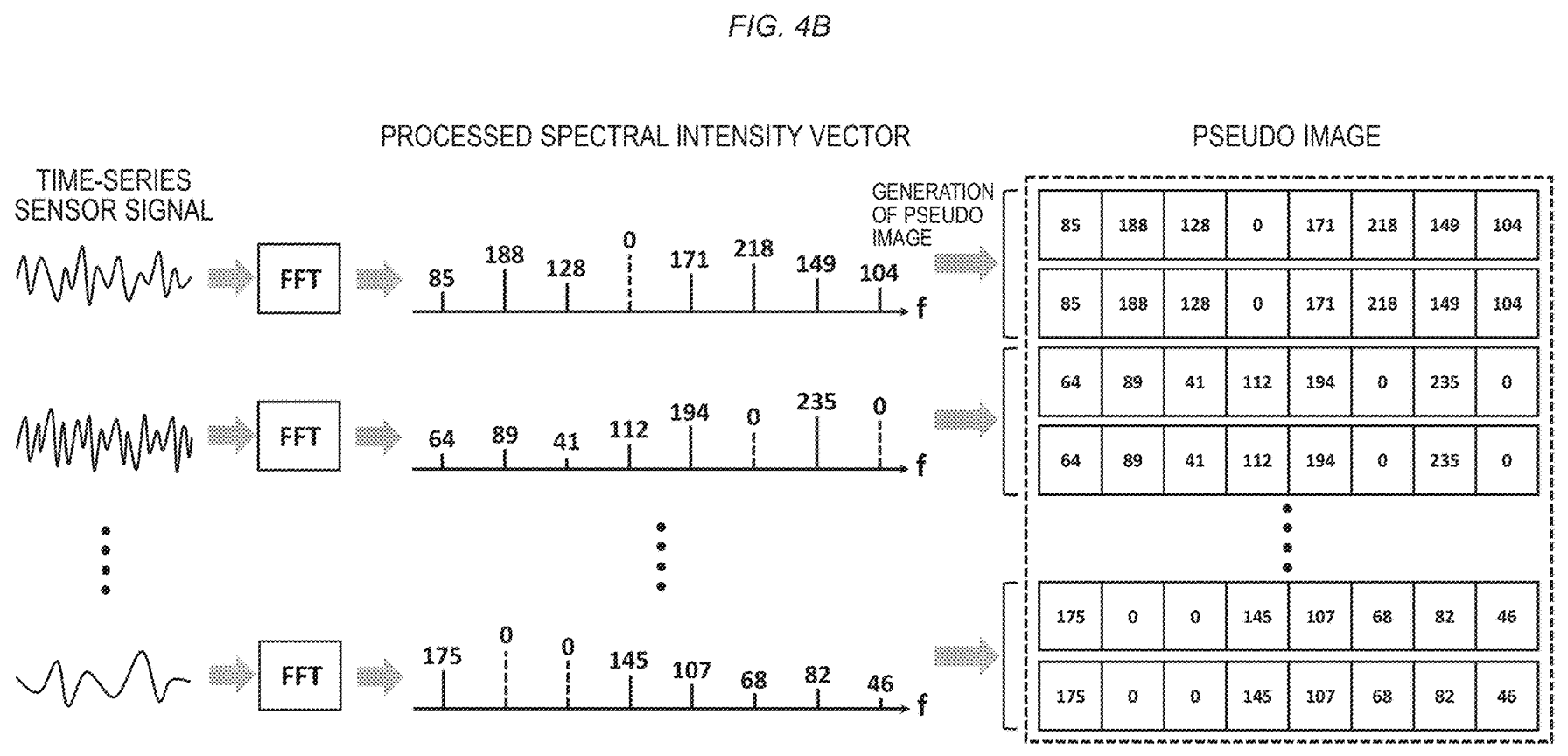

For example, in FIG. 4B, to eliminate the effect of unnecessary components included in the time-series signal of the first sensor, the fourth element corresponding to the frequency of the unnecessary components is set to zero. To eliminate the effects of two unnecessary components in the time-series signal of the second sensor, the sixth and eighth elements corresponding to the frequencies are set to zero. The time-series signal of the last sensor contains a broadband unnecessary component, and to eliminate such effect, the second and third elements corresponding to the occupied bandwidth of the unnecessary component are set to zero. The intensity processing unit 41 outputs the quantized spectral intensity vector after executing the substitution to zero (processed spectral intensity vector).

Note that a filter is required when eliminating unnecessary components directly from the time-series signal. In particular, it is not easy to design and implement a filter when unnecessary components are scattered in various frequencies, such as the time-series signal of the second sensor.

In contrast, in the present embodiment, since the time-series signal is transformed to the frequency domain information by the discrete Fourier transform or fast Fourier transform (FFT), as described above, it is possible to eliminate the effect of unnecessary components by simply substituting the value of the element of the quantized spectral intensity vector to zero. As illustrated in FIG. 4B, the operation also reflects zero in the pseudo image generated in the subsequent stage. Therefore, the effect of unnecessary components is eliminated from the pseudo image. Thus, the convolutional neural network 21 can classify pseudo images without being affected by unnecessary components.

According to FIG. 4C, an example of another operation of the intensity processing unit 41 will be described. In the case of the operation described in FIG. 4B, it is necessary to know the frequency of the unnecessary components in some way in advance. In contrast, FIG. 4C illustrates an example of the operation of the intensity processing unit 41 when the presence or frequency of unnecessary components is not known.

Similar to FIG. 4B, the quantized spectral intensity vector is input to the intensity processing unit 41 from the non-linear quantization unit 31 by the number of sensors. When the upper limit of the frequency spectral intensity of the required signal included in the time-series signal of each sensor is known, if there is a value exceeding the upper limit among the elements of the quantized spectral intensity vector, the intensity processing unit 41 replaces the value with the upper limit. Thus, although it is not possible to remove unnecessary components, it is possible to limit the effect.

Figure 4C:
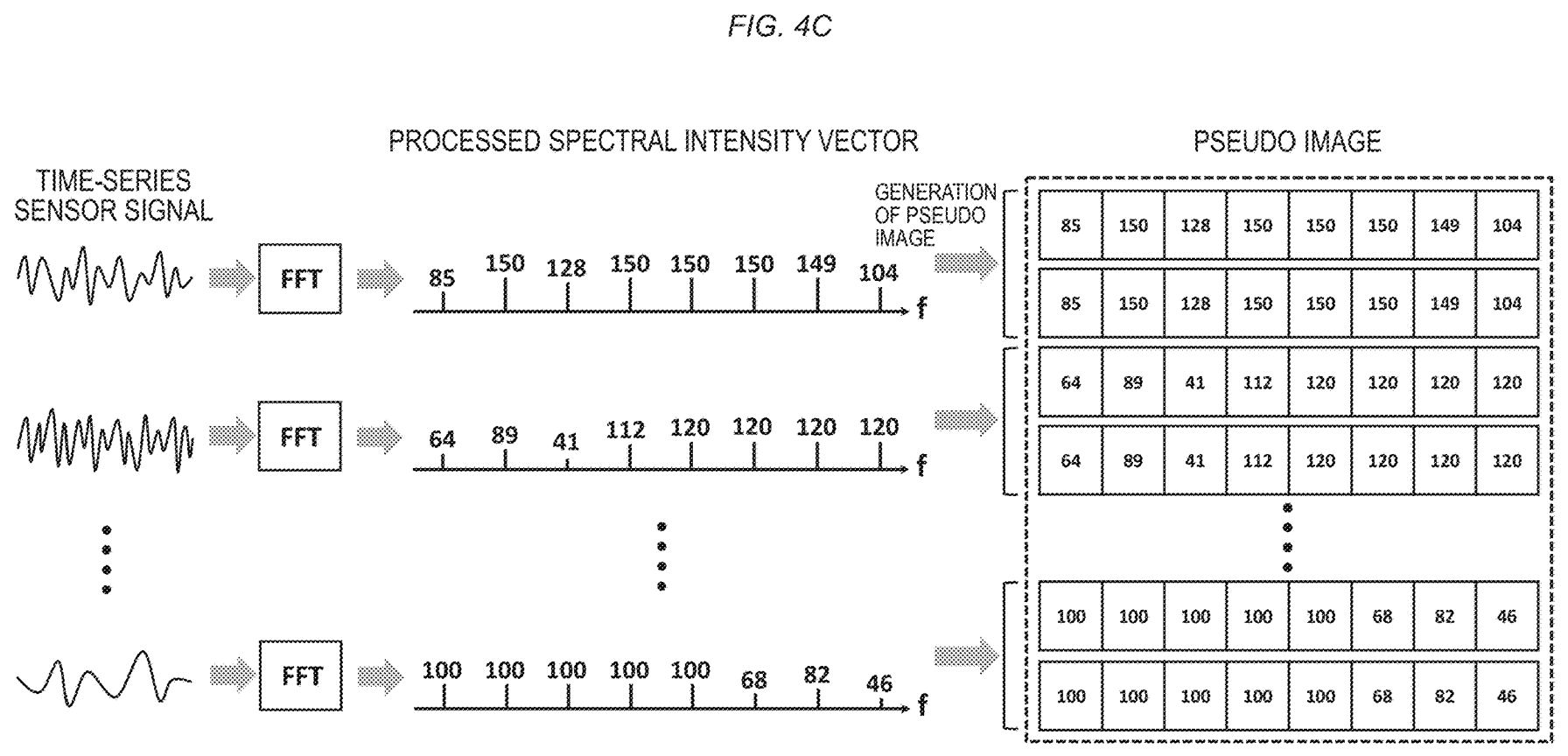

In the example of FIG. 4C, the upper limit (although the upper limit value after the normalization) of the frequency spectral intensity of the required signal included in the time-series signal of the first sensor is set to 150 and all values of the elements exceeding the upper limit are substituted to 150. Similarly, the upper limit for the second sensor is set to 120 and the upper limit for the third sensor is set to 100, the values of the elements above the upper limit are substituted. The intensity processing unit 41 outputs the quantized spectral intensity vector after executing the substitution (processed spectral intensity vector).

As illustrated in FIG. 4C, the operation also reflects the substitution result in the pseudo image generated in the subsequent stage. Therefore, the contribution of unnecessary components in the pseudo image can be reduced. Thus, the convolutional neural network 21 can classify pseudo images under a situation where the influence of unnecessary components is reduced.

In the present embodiment, although the intensity processing unit 41 is disposed in the subsequent stage of the non-linear quantization unit 31, the same operation is possible even if disposed in the precedent stage of the non-linear quantization unit 31, which is effective.

As described above, according to the present embodiment, in addition to the effect of the third embodiment, even if various unnecessary components are included in each sensor signal, it is possible to detect the state of a facility without being affected or under reduced conditions.

Fifth Embodiment

Figure 5A:
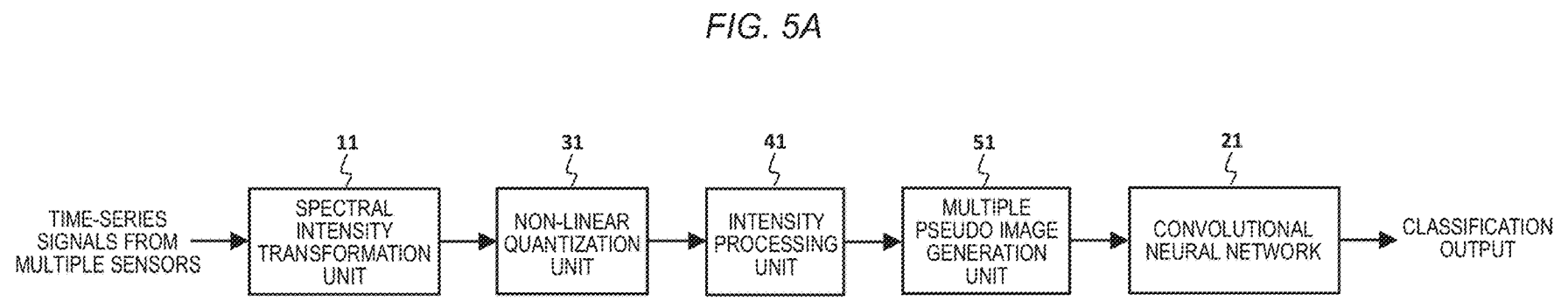

A configuration of a fifth embodiment of the present invention will be illustrated in FIG. 5A. In the present embodiment, the pseudo image generation unit 13 in the fourth embodiment is replaced with a multiple pseudo image generation unit 51. Since the operation of the other portion is as described in the first embodiment, the second embodiment, the third embodiment, and the fourth embodiment, the description thereof will be omitted.

As described in FIGS. 1B and 1C, when the size of the horizontal width and the vertical width of the pseudo image is defined, if the number of repetitions is increased to facilitate classification of the pseudo image or the number of points of the discrete Fourier transform and fast Fourier transform is increased to increase the frequency resolution, the number of sensors that can be handled in one pseudo image decreases. Therefore, especially when the number of sensors is large, there is a need to generate a plurality of pseudo images.

Therefore, in the present embodiment, the multiple pseudo image generation unit 51 generates a plurality of pseudo images. As described above, the quantized spectral intensity vector is input to the multiple pseudo image generation unit 51 by the number of sensors.

An example of the operation of the multiple pseudo image generation unit 51 will be described with reference to FIG. 5B. In the present example, the multiple pseudo image generation unit 51 generates three pseudo images from the time-series signals of 12 sensors. Four types of sensors are arranged on the facility or at three locations near the facility to monitor the state of the facility. The four types of sensors are sensors that detect physical quantities A, B, C, and D, respectively. The physical quantities, are for example, displacement, velocity, acceleration, strain, magnetism, and flow rate in each axial direction of x, y, and z, angle, angular velocity, and angular acceleration with respect to each rotation of Roll, Pitch, and Yaw, current and voltage, concentration of various gases and fluids, heat, temperature, humidity and the like.

The multiple pseudo image generation unit 51 generates one pseudo image for each of the three locations. That is, a first pseudo image is generated based on the time-series signal of the four types of sensors arranged in inspection point 1. Similarly, a second pseudo image is generated based on the time-series signal of the four types of sensors arranged at inspection point 2, and a third pseudo image is generated based on the time-series signal of the four types of sensors arranged at inspection point 3. In the analogy with the RGB image, the first pseudo image, the second pseudo image, and the third pseudo image are respectively referred to as the pseudo R image, the pseudo G image, and the pseudo B image.

Specifically, when the quantized spectral intensity vectors corresponding to each sensor are arranged in the vertical direction, the multiple pseudo image generation unit 51 conforms to the rules described below. That is, in the generation of each pseudo image, the quantized spectral intensity vectors corresponding to the sensors of the physical quantity A are arranged in the first ¼ area of the top in the pseudo image. Here, repetition and division described in FIG. 1B and FIG. 1C may be applied.

Similarly, the quantized spectral intensity vectors corresponding to the sensors of the physical quantity B are arranged in the second ¼ area from the top in the pseudo image, the quantized spectral intensity vectors corresponding to the sensors of the physical quantity C are arranged in the third ¼ area from the top in the pseudo image, and the quantized spectral intensity vectors corresponding to the sensors of the physical quantity D are arranged in the first ¼ area of the bottom in the pseudo image.

The three pseudo images generated by the multiple pseudo image generation unit 51 are input to the convolutional neural network 21. The convolutional neural network 21 processes the pseudo images simultaneously as pseudo-RGB images and outputs classification results.

Generally, the convolutional neural network can classify not only images represented by three channels of R, G, and B, but also images represented by the number of channels other than three channels. In addition to RGB, expressions such as CMY, HSV, and HLS, as well as YUV, YCbCr, and YPbPr formats are generally known as a method of expressing the color space. Although the present embodiment illustrates an example in which three pseudo images are generated, the number of pseudo images generated may be other than three. The present embodiment may employ a color space other than RGB, as described above. Again in the variations, the convolutional neural network 21 processes the pseudo images simultaneously and outputs classification results.

According to the above-described pseudo image generation method, the area in the pseudo image corresponding to the sensor of the physical quantity A is the first ¼ area from the top of all three pseudo images. Similarly, the area in the pseudo image corresponding to the sensor of the physical quantity B is the second ¼ area from the top of the three pseudo images, the area corresponding to the sensor of the physical quantity C is the third ¼ area from the top, and the area corresponding to the sensor of the physical quantity D is the area of the first ¼ area from the bottom.

Thus, the areas in the pseudo image corresponding to the same type of sensor are the same for all three pseudo images. Generally, in a convolutional neural network, when an image of a plurality of channels (plural number) is input, multiply-accumulation operation on the pixel values of the same area in the image of the plurality of channels is operated to fuse the information of the plurality of channels, and feature extraction and classification are performed based on the fused information.

Figure 5B:
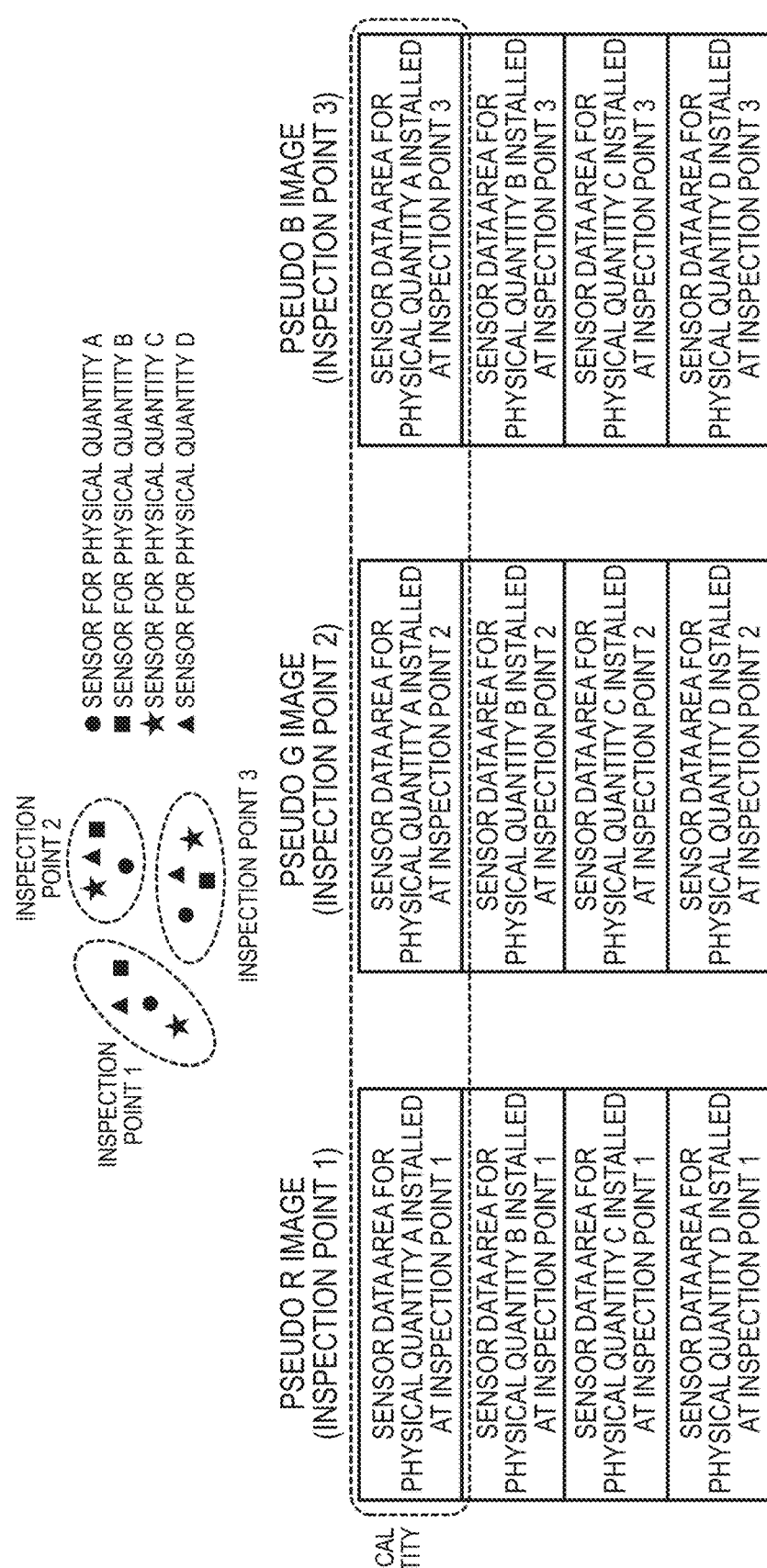
FIG. 5B is a diagram illustrating an example of a plurality of pseudo images generated by a multiple pseudo image generation unit.

Accordingly, by inputting a plurality of pseudo images generated by the method of FIG. 5B into the convolutional neural network 21, the convolutional neural network 21 fuses information on the signals of similar sensors arranged in different locations, and performs feature extraction and classification based on the fused information. Thus, the information obtained at different locations is fused and it is possible to increase the accuracy of the classification of the state of a facility.

Figure 5C:
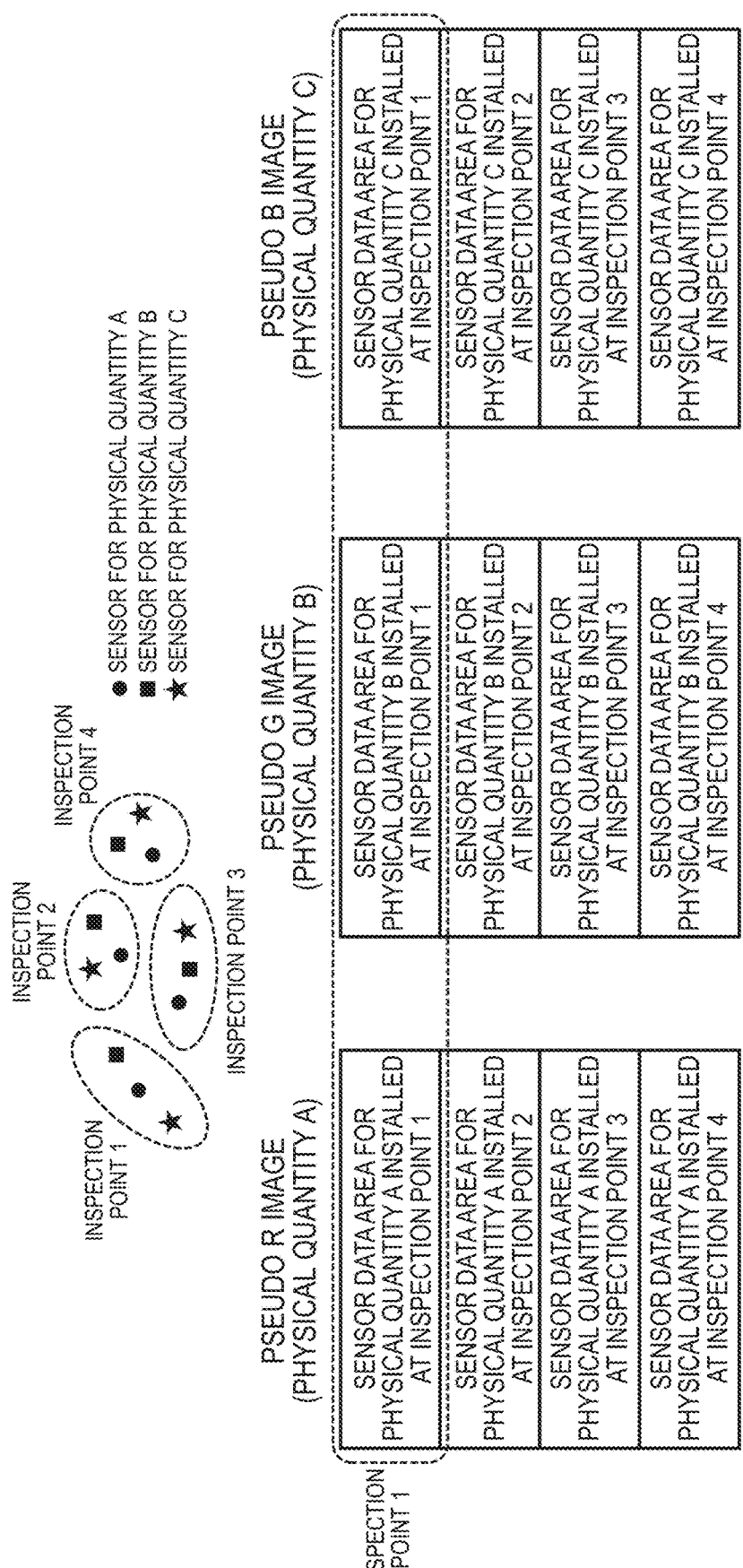
FIG. 5C is a diagram illustrating an example of a plurality of pseudo images generated by the multiple pseudo image generation unit.

The multiple pseudo image generation unit 51 may generate a plurality of pseudo images by a method different from that of FIG. 5B. Another method will be described with reference to FIG. 5C. In the present example as well, the multiple pseudo image generation unit 51 generates three pseudo images from the time-series signals of 12 sensors. Three types of sensors are arranged on the facility or at four locations near the facility to monitor the state of the facility. The three types of sensors are sensors that detect physical quantities A, B, and C, respectively.

The multiple pseudo image generation unit 51 generates one pseudo image for each of the three types of sensors. That is, based on the time-series signal of the sensor of the physical quantity A arranged in four locations (inspection point 1, inspection point 2, inspection point 3, and inspection point 4), a first pseudo image is generated. Similarly, a second pseudo image is generated based on the time-series signal of the sensor of the physical quantity B arranged at four inspection points, and a third pseudo image is generated based on the time-series signal of the sensor of the physical quantity C arranged at four inspection points. Similar to the case of FIG. 5b, in the analogy with the RGB image, the first pseudo image, the second pseudo image, and the third pseudo image are respectively referred to as the pseudo R image, the pseudo G image, and the pseudo B image.

Specifically, when the quantized spectral intensity vectors corresponding to each sensor are arranged in the vertical direction, the multiple pseudo image generation unit 51 conforms to the rules described below. That is, in the generation of each pseudo image, the quantized spectral intensity vectors corresponding to the sensors installed at inspection point 1 are arranged in the first ¼ area of the top in the pseudo image. Here, repetition and division described in FIG. 1B and FIG. 1C may be applied.

Similarly, the quantized spectral intensity vectors corresponding to the sensors of the physical quantity installed at inspection point 2 are arranged in the second ¼ area from the top in the pseudo image, the quantized spectral intensity vectors corresponding to the sensors installed at inspection point 3 are arranged in the third ¼ area from the top in the pseudo image, and the quantized spectral intensity vectors corresponding to the sensors installed at inspection point 4 are arranged in the first ¼ area of the bottom in the pseudo image.

According to the above-described pseudo image generation method, the area in the pseudo image corresponding to the sensor installed at inspection point 1 is the first ¼ area from the top of all three pseudo images. Similarly, the area in the pseudo image corresponding to the sensor installed at inspection point 2 becomes the second ¼ area from the top of the three pseudo images, the area corresponding to the sensor installed in inspection point 3 becomes the third ¼ area from the top, and the area corresponding to the sensor installed at inspection point 4 becomes the first ¼ area from the bottom. Thus, the areas in the pseudo image corresponding to the sensor installed at the same inspection point are the same for all three pseudo images.

As described above, generally, in a convolutional neural network, when an image of a plurality of channels (plural number) is input, multiply-accumulation operation on the pixel values of the same area in the image of the plurality of channels is operated to fuse the information of the plurality of channels, and feature extraction and classification are performed based on the fused information. Accordingly, by inputting a plurality of pseudo images generated by the method of FIG. 5C into the convolutional neural network 21, the convolutional neural network 21 fuses information on the signals of different types of sensors arranged in the same location, and performs feature extraction and classification based on the fused information. Thus, the information obtained at different types of sensors is fused and it is possible to increase the accuracy of the classification of the state of a facility.

As described above, according to the present embodiment, in addition to the effect of the fourth embodiment, even when the number of sensors is large, it is possible to classify the state of a facility by utilizing the information. The state of a facility can be classified by fusing the information of sensors installed at different locations or by fusing the information of different types of sensors. Therefore, it is possible to detect the state of a facility with a higher accuracy.

Sixth Embodiment

Figure 6A:
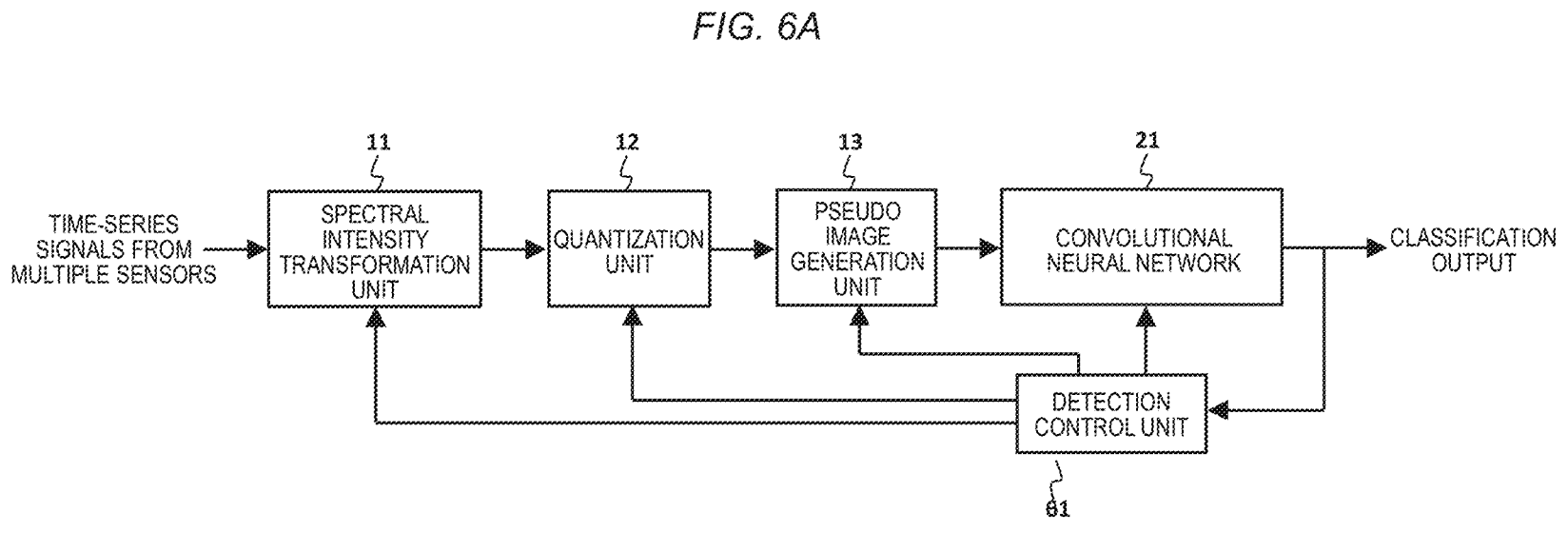

A configuration of a sixth embodiment of the present invention will be illustrated in FIG. 6A. In the present embodiment, a detection control unit 61 is added to the second embodiment. The detection control unit 61 performs adaptive control based on the classification result. Since the operation of the other portion is as described in the first embodiment and the second embodiment, the description thereof will be omitted.

The operation of the detection control unit 61 will be described with reference to FIG. 6B. As described in the first embodiment, the discrete Fourier transform and the fast Fourier transform (FFT) point number determines the time width ("FFT time width" in FIG. 6B) of the sensor signal used to generate each pseudo image. The frequency resolution (the interval of each frequency position) is equal to the reciprocal of the time width. In the present embodiment, the generation and classification of the pseudo image are performed at a constant time interval ("FFT period" in FIG. 6B).

The detection control unit 61 adaptively controls the FFT time width and the FFT period according to the classification result output by the convolutional neural network 21. For example, if the convolutional neural network 21 outputs a probability belonging to the first normal state, the second normal state, the first abnormal state, the second abnormal state, or the third abnormal state, when the value of the highest probability is lower than a predetermined value, the FFT time width is increased to increase the frequency resolution of the discrete Fourier transform or fast Fourier transform to increase the accuracy of the classification. As such, the FFT time width can be automatically reached to an appropriate FFT time width setting value by updating the FFT time width as necessary while executing classification of the state of the facility.

Alternatively, if any of the probability belonging to the first abnormal state, the probability belonging to the second abnormal state, and the probability belonging to the third abnormal state is higher than the predetermined value in the classification result output by the convolutional neural network 21, it is considered that there is a possibility that abnormality occurs in the facility, the FFT time width is set to a long value, and the state of the facility may be monitored in a state of the frequency resolution of the discrete Fourier transform and the fast Fourier transform increased. To increase the frequency of the state detection, the FFT period may be set to a short value to monitor the state of the facility.

The detection control unit 61 notifies the setting values of the FFT time width and the FFT period to the spectral intensity transformation unit 11, the quantization unit 12, the pseudo image generation unit 13, and the convolutional neural network 21. The spectral intensity transformation unit 11 periodically executes the discrete Fourier transform and fast Fourier transform (FFT) of the point number corresponding to the notified FFT time width at a period equal to the notified FFT period.

The quantization unit 12 reduces the expression word length as described above for the spectral intensity vector of the dimension number corresponding to the notified FFT time width. The operation is executed periodically at a period equal to the notified FFT period.

The pseudo image generation unit 13 generates a pseudo image as described above using the quantized spectral intensity vector of the dimension number corresponding to the notified FFT time width. The operation is executed periodically at a period equal to the notified FFT period.

The convolutional neural network 21 also executes classification of the pseudo image and outputs the classification result in a period equal to the notified FFT period in which the weight parameters and the like trained in advance assuming the FFT time width are set to process the pseudo image corresponding to the notified FFT time width.

Figure 6B:
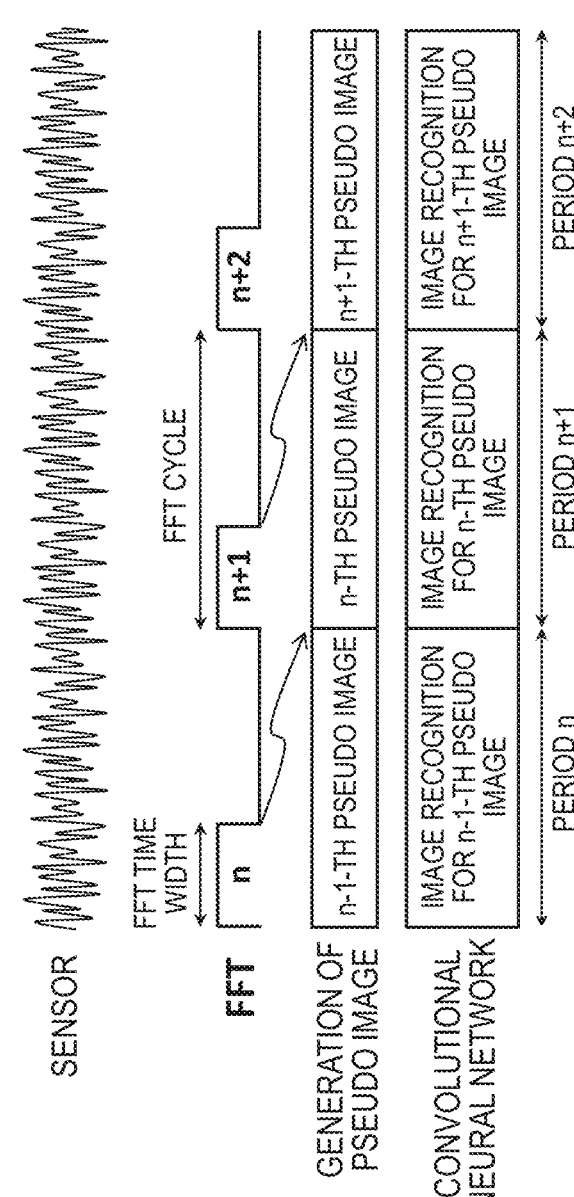
FIG. 6B is a diagram illustrating an example of the operation of a detection control unit.

FIG. 6B illustrates an example of the operation timing. The time series signal of the sensor within a certain period (period n) is transformed into a pseudo image by the spectral intensity transformation unit 11, the quantization unit 12, and the pseudo image generation unit 13 during that period, and is supplied to the convolutional neural network 21 during the following period (period n+1). The convolutional neural network 21 performs classification of the supplied pseudo image at period n+1 and outputs classification results. The detection control unit 61 operates as described above based on the classification result.

Thus, in the present embodiment, it is possible to set the FFT time width and FFT period to a value required according to the situation. Thus, since it is possible to avoid increasing the FFT time width unnecessarily or shortening the FFT period unnecessarily, it is possible to reduce the power consumption.

As described above, according to the present embodiment, in addition to the effect of the second embodiment, it is possible to reduce the power consumption of the system for monitoring the state of the facility by providing the adaptability.

Seventh Embodiment

Figure 7:
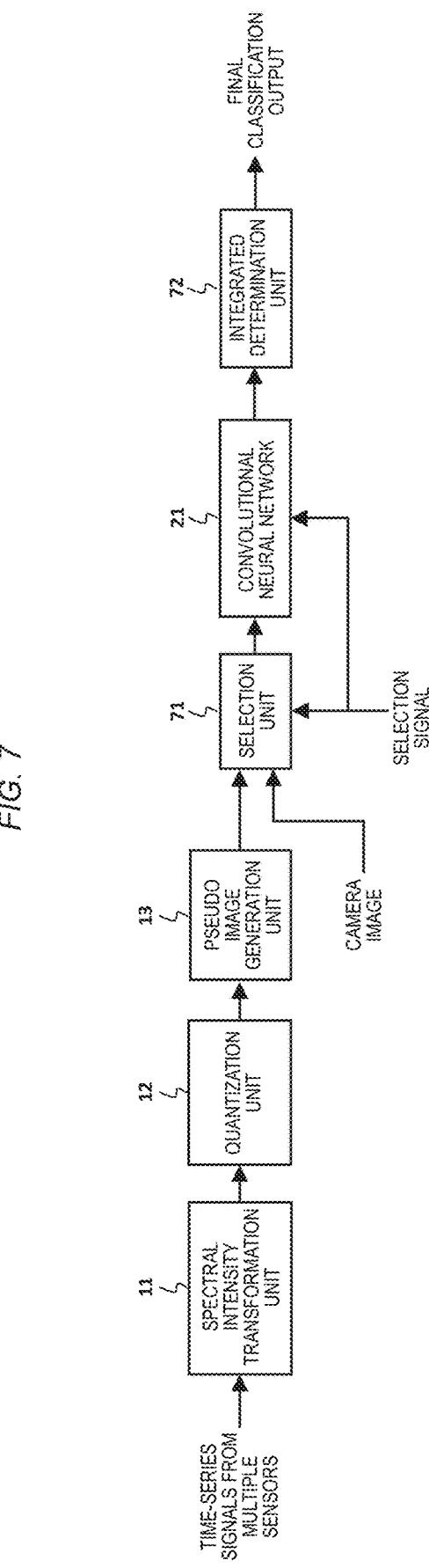
FIG. 7 is a diagram illustrating a configuration example of state detection apparatus according to a seventh embodiment.

A seventh embodiment of the present invention will be described with reference to FIG. 7. In the present embodiment, the second embodiment is extended to handle general camera images. Therefore, the selection unit 71 is inserted before the convolutional neural network 21 and an integrated determination unit 72 is added to the subsequent stage. Since the spectral intensity transformation unit 11, the quantization unit 12, and the pseudo image generation unit 13 are the same as the first embodiment and the second embodiment, a description thereof will be omitted.

As described above, a pseudo image is output from the pseudo image generation unit 13. A pseudo image and a camera image (RGB image, RGBD image, grayscale image, monochrome image, and the like acquired by imaging apparatus such as a camera) are input to the selection unit 71. The selecting unit 71 outputs by selecting either the pseudo image and the camera image based on the selection signal to be input. The selection signal is also input to the convolutional neural network 21.

When the pseudo image is selected as the selection signal, the selection unit 71 selects and outputs the pseudo image. The convolutional neural network 21 is set with a weight parameter for classifying the pseudo image according to the instruction of the selection signal. Note that the weight parameter and the like are obtained in advance by the training method described using FIG. 2C. Accordingly, the convolutional neural network 21 performs classification of the pseudo image and outputs the classification result to the integrated determination unit 72 of the subsequent stage.

On the other hand, when the selection signal selects the camera image, the selection unit 71 selects and outputs the camera image. The convolutional neural network 21 is set with a pre-trained weight parameter for classifying the camera image according to the instruction of the selection signal. Accordingly, the convolutional neural network 21 performs classification of the camera image and outputs the classification result to the integrated determination unit 72 of the subsequent stage.

Similar to the classification result for the pseudo image, the classification result is the probability of belonging to the state of each appearance. The state of each appearance is, for example, a state of normal appearance, a state of slight cracking, a state of slight discoloration, a state of obvious cracking, a state of obvious discoloration, and the like. The weight parameters and the like have been trained in advance so that the state of each appearance can be classified.

The selection signal may be switched each time the selection of the pseudo image and the camera image or may be switched after a certain period of time. Accordingly, the classification result of the pseudo image and the classification result of the camera image are alternately input to the integrated determination unit 72.

The integrated determination unit 72 determines and outputs the final classification result concerning the state of the facility based on the classification result of the pseudo image and the classification result of the camera image. For example, if the probability of belonging to the second normal state is the highest in the classification result of the pseudo image and the probability of belonging to the normal appearance state is the highest in the classification result of the camera image, the final classification result is output that the facility is in the second normal state.

For example, if the classification result of the pseudo image has the highest probability of belonging to the first normal state and the probability of belonging to the obvious cracking state or obvious discoloration state is the highest in the classification result of the camera image, the final classification result is output that the facility is in the first abnormal state. Here, classification results of pseudo images and classification results of camera images clearly support the same conclusion.

For example, when the probability of belonging to the first normal state is the highest in the classification result of the pseudo image and the probability of belonging to a state other than the normal appearance state is the highest in the classification result of the camera image, if the value of the probability of belonging to the first normal state is higher than a predetermined value, the classification result of the pseudo image is weighed and the first normal state is output as the final classification result.

On the other hand, if the probability of belonging to the first normal state is lower than the predetermined value, based on the fact that an abnormality is indicated from the classification result of the camera image, the abnormal state having the highest value (for example, the second abnormal state) among the probability of belonging to the first abnormal state, the probability of belonging to the second abnormal state, the probability of belonging to the third abnormal state of the classification result of the pseudo image is output as the final classification result.

For example, when the probability of belonging to the third abnormal state is the highest in the classification result of the pseudo image and the probability of belonging to the normal appearance state is the highest in the classification result of the camera image, if the value of the probability of belonging to the third abnormal state is higher than a predetermined value, the classification result of the pseudo image is weighed and the third abnormal state is output as the final classification result.

On the other hand, if the probability of belonging to the third abnormal state is lower than the predetermined value, based on the fact that an abnormality is not detected in the classification result of the camera image, the normal state having the highest value (for example, the second normal state) between the probability of belonging to the first normal state and the probability of belonging to the second normal state of the classification result of the pseudo image is output as the final classification result.

Note that the integrated determination unit 72 may determine and output the final classification result in various methods other than the above.

Thus, according to the present embodiment, it is possible to select the image to be analyzed. In addition to the effect of the second embodiment, by determining to use both the state detection result by the pseudo image (that is, the sensor) and the appearance detection result by the camera image, it is possible to classify the state of the facility with a higher accuracy.

Eighth Embodiment

An eighth embodiment of the present invention will be described with reference to FIG. 8. Since it is possible to obtain an accurate frequency spectrum by using FFT in the generation of pseudo images up until the present, there is an advantage that the accuracy can be improved by the processing on the frequency axis such as the removal of the specific interference frequency and the filtering.

On the other hand, for the processing of the pseudo image, it becomes possible to obtain different effect by obtaining the spectrum by the basis transformation with a technique other than FFT. Specifically, by using Walsh-Hadamard transform (WHT) for generating a spectral intensity, the multiplication during spectral intensity transformation can be eliminated, and thus, the circuit size can be reduced. When using the discrete cosine transform (DCT), since the window function processing can be omitted, it is possible to reduce the circuit scale. When using WHT, high classification performance is required for the image analysis of the later stage, because the spectrum obtained by the transformation of the multiplier is easy to disperse the power to the whole base compared with FFT. When using DCT, the image size can be reduced by generating a pseudo image by eliminating the high frequency division, because the power is concentrated in the low frequency component.

FIG. 8A illustrates a case in which a time-series sensor signal was transformed into a spectral intensity. Depending on each transformation, the base and spectral intensity obtained after the transformation differ.

Figure 8C:
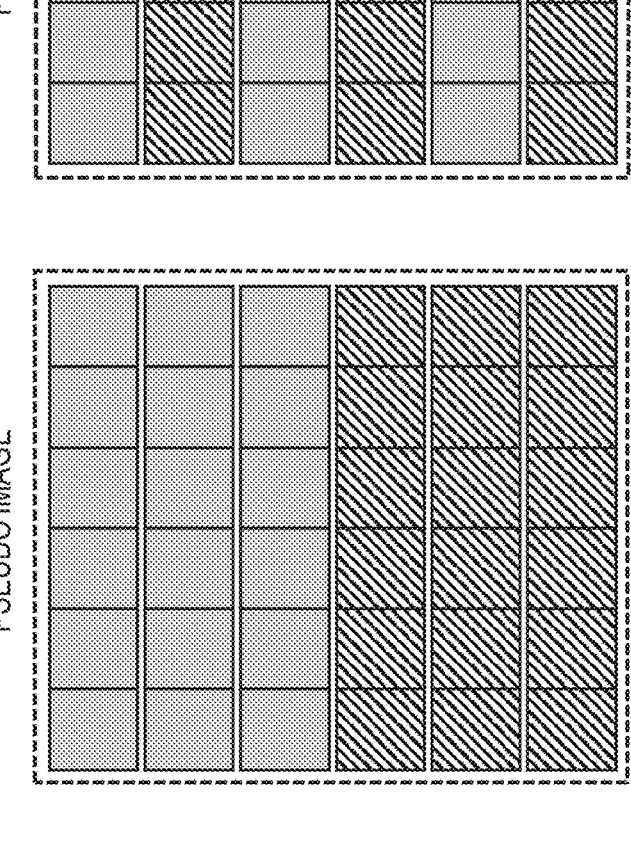
FIG. 8C is a diagram illustrating an example of a pseudo image.

FIG. 8B illustrates a case in which a pseudo image was generated using such methods. Since different spectral intensities are obtained for FFT and WHT, different images are generated. Since different spectra can be obtained by using different basis transformations (orthogonal transformations), by mixing multiple types of these, it is possible to increase the local feature quantity used for classification and improve the classification accuracy. FIG. 8C illustrates an example of generating a pseudo image using FFT and WHT. Depending on the method of mixing multiple types in different proportions, the method of mixing them in the same proportions and arranging them in close proximity, and the method of arranging them together for each transformation, different accuracy and calculation amount can be obtained. Although an example using FFT and WHT has been described, other types of combinations may be employed. Three or more orthogonal transformations may be used.

Ninth Embodiment

A ninth embodiment of the present invention will be described with reference to FIG. 9. In the ninth embodiment, by generating a pseudo image using a plurality of basis transformations (orthogonal transformations), it is possible to improve the classification performance and the function of feature quantity extraction. On the other hand, when the signal from the sensor has a lot of noise, when the power is concentrated in the component after a specific basis transformation, or when the classification performance of the image processing unit is not high, using only a specific transformation rather than using a plurality of transformations may improve the classification performance of the entire process. Since such processes depend on the application and the sensor, it is possible to optimize performance according to multiple types of applications and image processing by adaptively switching the ratio of the pre-processing by using an allocation control table (allocation table) to determine which basis transformation of the pre-processing unit is used at what ratio according to the image processing and application.

Figure 9A:
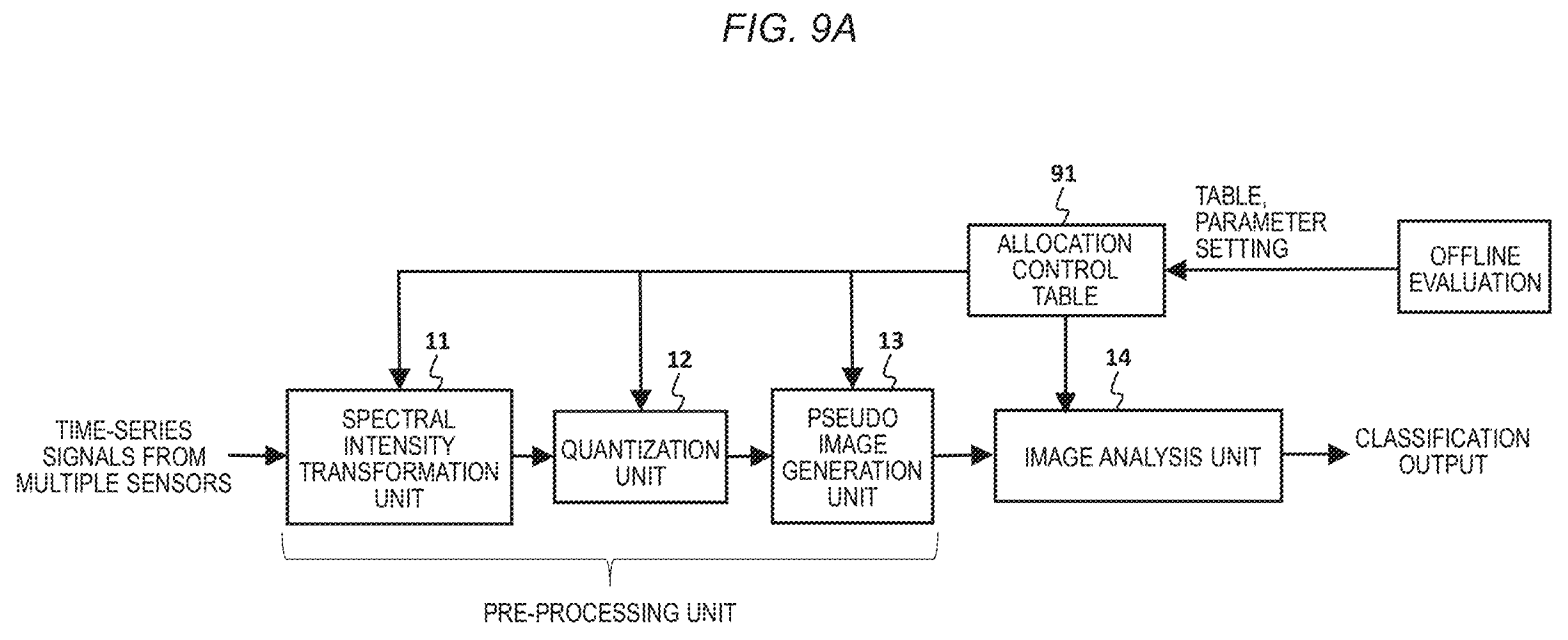

FIG. 9A illustrates a block diagram of a method for switching the allocation of the basis transformation process using an allocation control table 91 in the pre-processing unit. In the allocation control table 91, the allocation ratio of the combination of the basis transformation according to the algorithm of the application and the image analysis unit is registered by the preliminary offline evaluation. The allocation ratio is set based on the loss when processing the test data and the classification accuracy.

FIG. 9B illustrates a block diagram when a neural network is used for the image analysis unit. In a convolutional neural network, there is a trade-off between classification performance and calculation amount depending on the number of layers, the number of parameters, and the type of network, and the optimal pre-processing ratio differs accordingly. For example, if the classification performance of the neural network is low, since the pseudo image generation unit is required to have a high feature extraction function, a method using FFT or mixing a plurality of orthogonal transformations is more suitable than a method using only Walsh-Hadamard transform to improve the overall processing accuracy. In the present embodiment, the allocation control table 91 registers an allocation ratio that increases the classification accuracy based on test data, loss during network training, and accuracy for at least one of the application, sensor type, and neural network type.

Figure 9C:
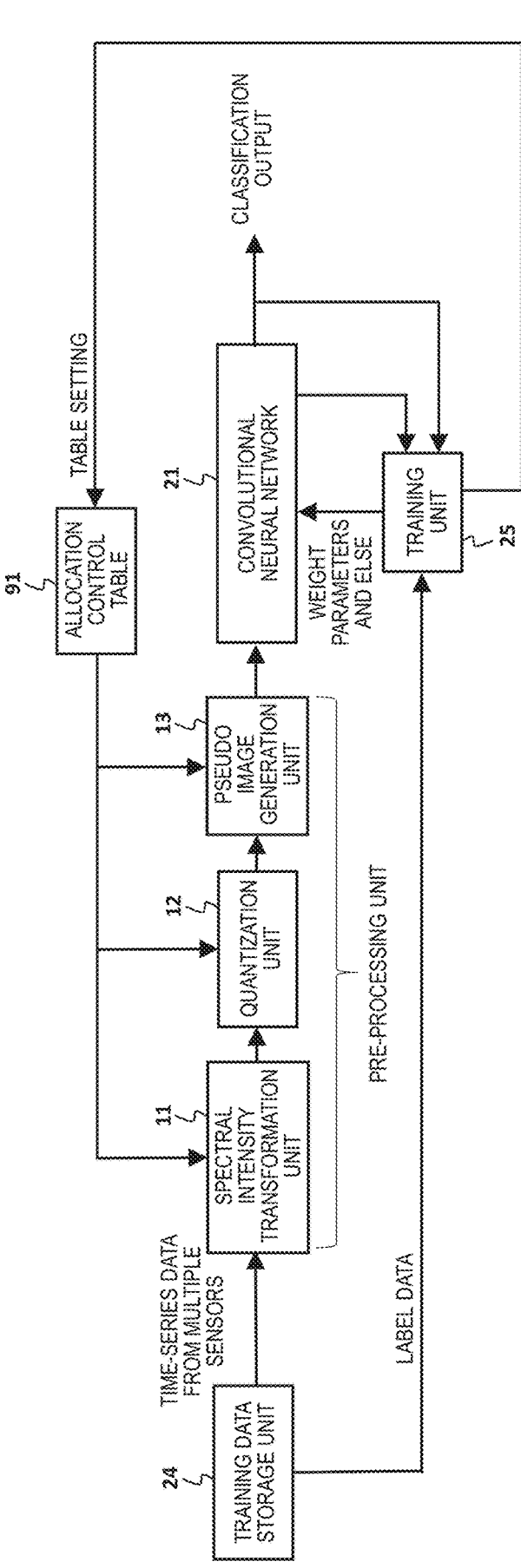
FIG. 9C is a diagram illustrating a configuration example of state detection apparatus according to the ninth embodiment.

FIG. 9C is a block diagram illustrating a method of updating the allocation control table in a system having a training unit. In FIG. 9C, input sensor data is used as training data to update the allocation ratio in the allocation control table 91 registered in advance. The loss and accuracy deterioration during training of the input sensor data are monitored, and table data with the pre-processing allocation ratio changed is added when the loss or accuracy deterioration exceeds a certain level. That is, the system performs training and processing in real time, and the allocation control table 91 is updated by on-chip training. A change in the allocation ratio reduces the ratio of orthogonal transformation with low classification accuracy alone and increases the ratio of methods with high orthogonal transformation ratio alone. If there is no change in classification accuracy after the change, the number of types of orthogonal transformation is increased.

Tenth Embodiment

A tenth embodiment of the present invention will be described with reference to FIG. 10. In the abnormality detection apparatus (state detection apparatus) of the present invention, a suitable combination of pre-processing and image processing used for abnormality detection varies depending on the application using the abnormality detection, the hardware used for the abnormality detection, and the algorithms available for the hardware. Therefore, advice software that configures or sends instructions to configure a suitable pre-processing unit and a computation processing unit that performs image analysis processing based on the accuracy and hardware resources required for abnormality detection is useful.

Figure 10:
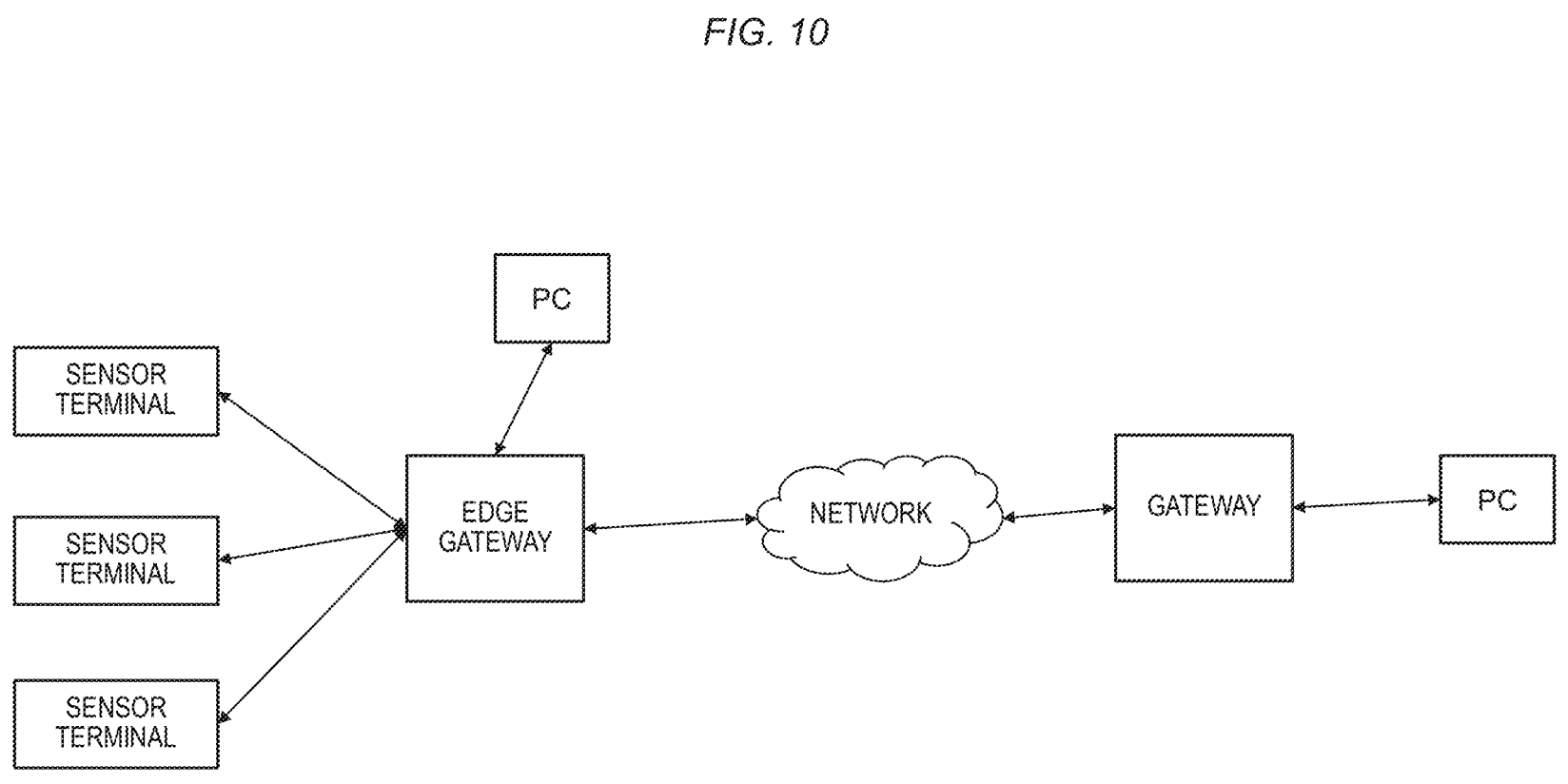

In FIG. 10, the abnormality detection apparatus is mounted on or connected to a sensor terminal, and software (advice software) for setting or for instructing to set algorithms for the pre-processing unit and the computation processing unit of at least one abnormality detection apparatus is mounted in a personal computer (PC). The PCs equipped with advice software may exist via a network, and depending on the detection accuracy sent from the abnormality detection apparatus, the update frequency of hardware resources, and the data size of the parameters sent from the advice software, an appropriate system configuration is adopted.

<Hardware Configuration>

Next, an example of the hardware configuration of the state detection apparatus will be described with reference to FIG. 11. The state detection apparatus illustrated in FIG. 11 includes a plurality of sensors (81*a* and 81*b*), a camera 82, a plurality of A/D converters (83*a* and 83*b*), a computation unit, input apparatus 89, and output apparatus 90.

The sensor is located on or in the vicinity of the facility to monitor the state of the facility, as described above, and detects a predetermined physical quantity. In the present example, two sensors (81*a* and 81*b*) are disposed, but more sensors may be disposed. Similar to the case of the sensor, the camera 82 is located to monitor the state of the facility and acquires the camera image by imaging. The A/D converters (83*a*, 83*b*) are used to convert the analog output of the sensor to a digital signal. If the sensor (81*a*, 81*b*) outputs a digital signal, the A/D converter (83*a*, 83*b*) may be omitted.

Next, a description will be given of the computation unit. The computation unit performs the computation processing based on the input data, and performs the spectral intensity transformation, quantization, pseudo image generation, image analysis (processing by the convolution neural network 21), and the like described above. In the present example, the computation unit includes a general purpose processor 85 and a dedicated circuit 86, as the main configuration of the data processing (processing apparatus 84) and executes the data processing using the configuration as appropriate.

In the present example, the general purpose processor 85 is referred to as a central processing unit (CPU), but is not limited thereto, and may be configured by using other semiconductor apparatus, for example. The dedicated circuit 86 is used as an accelerator to improve data processing. The dedicated circuit 86 can be appropriately configured. As the dedicated circuit 86, for example, a graphics processing unit (GPU), a field programmable gate array (FPGA) or the like may be used. Note that it may be possible to appropriately execute a predetermined process and the configuration of the processing apparatus 84 may be changed as appropriate.

The computation unit includes a storage 87 and a memory 88. The storage 87 stores appropriate data such as programs used for processing. The storage 87 stores, as a program executed by the processing apparatus 84, for example, the spectral intensity transformation unit 11, the quantization unit 12, the pseudo image generation unit 13, the image analysis unit 14, the non-linear quantization unit 31, the intensity processing unit 41, the multiple pseudo image generating unit 51, the detection control unit 61, the selection unit 71, and the integrated determination unit 72. The storage 87 also stores data about the convolutional neural network 21 for image analysis. The storage 87 may store data input from the sensor (81*a*, 81*b*) or the camera 82, data of the generated pseudo image, and the like.

The storage 87 may store the training unit 25, which is a program used for processing related to the convolutional neural network 21, and the training data storage unit 24, which is a storage area for storing training data, may be disposed. The storage 87 may store the allocation control table 91.

The storage 87 can be configured using, for example, a hard disk drive (HDD). The memory 88 is configured using, for example, a random access memory (RAM), and the processing apparatus 84 executes processing (predetermined processing such as spectral intensity transformation, quantization, pseudo image generation, image analysis, and the like) based on the programs and data read into the memory 88.

The input apparatus 89 is used for the user to make various settings related to the operation of the apparatus and is configured using a keyboard, mouse, touch panel, or the like as appropriate. The output apparatus 90 is used to display the classification results of the state of the facility and the user's input contents, and may be configured using a display or the like as appropriate.

Although the embodiments of the present invention have been described in detail above, the present invention is not limited to the above-described embodiments, and various design changes can be made without departing from the spirit of the invention described in the claims. For example, the embodiments described above are those described in detail to explain the present invention in an easy-to-understand manner, not necessarily limited to those having all the configurations described. It is possible to replace a part of the configuration of one embodiment with the configuration of another embodiment, and it is also possible to add the configuration of the other embodiment to the configuration of one embodiment. It is possible to add, delete, or replace another configuration for a part of the configuration of each embodiment. Unless specifically limited, each component may be singular or plural.

Although an example in which a plurality of sensors are disposed has been specifically described, even when a single sensor is disposed, the state detection apparatus may perform the same processing as described above to detect the state of the facility. That is, the state detection apparatus may transform the time-series sensor signal obtained from a single sensor into a spectral intensity vector, generate a pseudo image, and perform image analysis. Here, even in the case of processing data of a single sensor, the state detection apparatus may perform the same processing (for example, generation of a pseudo image in which the spectral intensity vectors are divided, generation of a pseudo image in which the spectral intensity vectors (or spectral intensity sub-vectors) are repeated, non-linear quantization, and the like) by the method described above.

Input of the selection signal to the selection unit 71 may be performed by a user using the input apparatus 89. The selection unit 71 may then switch the image in response to the input of the user. Here, it is possible to switch to an image intended by the user.

Figure 11:
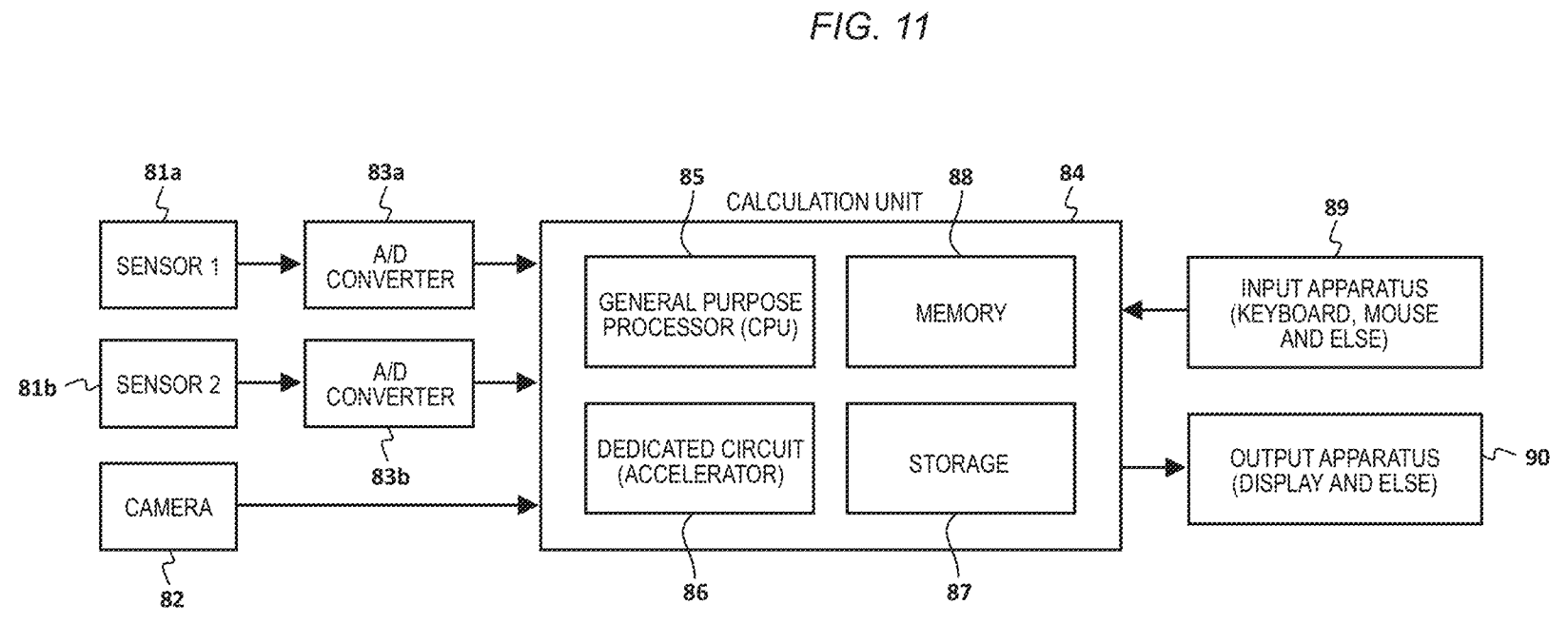

The PC (computer) illustrated in FIG. 11 may be appropriately configured using a known configuration such as a CPU, storage apparatus, and an interface. A computer different from the PC may also be used.

What is claimed is:

1. A state detection apparatus comprising:

a plurality of sensors; and a processing apparatus coupled with the plurality of sensors and configured to execute data processing operations comprising transforming data of a plurality of digitized time-series signals each associated with one of the plurality of sensors into data relating to spectral intensity comprising a spectral intensity vector for each of the digitized time-series signals;

quantizing each spectral intensity vector into a quantized spectral intensity vector;

generating a pseudo image based on the data relating to the spectral intensity by generating a two-dimensional image by arranging each quantized spectral intensity vector corresponding to one of the plurality of sensors as one or more rows in a vertical direction; and analyzing the pseudo image and outputting a classification result of a state of a facility based on the analysis of the pseudo image, wherein a width in pixels of the generated pseudo image is equal to a number of dimensions of the quantized spectral intensity vector, wherein a vertical size of the pseudo image in a number of pixels is equal to a product of the number of sensors and a number of the one or more rows, and wherein a pixel value of the pseudo image is equivalent to a frequency spectral intensity of the digitized time-series signal of the sensor such that the pseudo image is independent of a phase of the digitized time-series signal.

2. The state detection apparatus according to claim 1, wherein the processing apparatus performs the transformation by discrete Fourier transform or fast Fourier transform.

3. The state detection apparatus according to claim 2, wherein the processing apparatus analyzes the pseudo image by a convolutional neural network.

4. The state detection apparatus according to claim 3, wherein the processing apparatus performs a process of transforming a value corresponding to the spectral intensity into a non-linear quantization, in the transformation.

5. The state detection apparatus according to claim 4, wherein the processing apparatus performs a process of replacing a part of the value of the data relating to the spectral intensity, in the transformation.

6. The state detection apparatus according to claim 4, wherein the plurality of sensors is included in a plurality of sensor groups each including different types of sensors, the plurality of sensor groups is disposed at different inspection points, and the processing apparatus generates a plurality of pseudo images, wherein when generating the plurality of pseudo images, data relating to the spectral intensities of the sensors of the same type is arranged in a same area among the plurality of pseudo images to be generated.

7. The state detection apparatus according to claim 4, wherein the plurality of sensors is included in a plurality of sensor groups each including different types of sensors, the plurality of sensor groups is disposed at different inspection points, and the processing apparatus generates a plurality of pseudo images, wherein when generating the plurality of pseudo images, data relating to the spectral intensities of the sensors located at the same inspection point is arranged in a same area among the plurality of pseudo images to be generated.

8. The state detection apparatus according to claim 3, wherein the processing apparatus sets a time width or period of discrete Fourier transform or fast Fourier transform based on an output of the convolutional neural network.

9. The state detection apparatus according to claim 3, further comprising:

a camera for acquiring a camera image; and an input apparatus for a user to use, wherein the processing apparatus processes the camera image or the pseudo image selected by the user with the convolutional neural network.

10. The state detection apparatus according to claim 1, wherein the processing apparatus analyzes the pseudo image by a convolutional neural network.

11. The state detection apparatus according to claim 1, wherein the processing apparatus executes the transformation using at least one of discrete cosine transform, discrete sine transform, discrete Fourier transform that is slower than fast Fourier transform, and Walsh-Hadamard transform.

12. The state detection apparatus according to claim 1, wherein the processing apparatus executes the transformation using a combination of at least two of discrete cosine transform, discrete sine transform, discrete Fourier transform, fast Fourier transform, and Walsh-Hadamard transform.

13. The state detection apparatus according to claim 1, further comprising:

an allocation table that stores an allocation of orthogonal transforms used for the transformation, wherein the processing apparatus executes the transformation using at least one of discrete cosine transform, discrete sine transform, discrete Fourier transform, fast Fourier transform, and Walsh-Hadamard transform, based on the allocation table.

14. The state detection apparatus according to claim 13, wherein the processing apparatus updates the allocation table based on information input during on-chip training.

15. A system using the state detection apparatus according to claim 1, the system comprising:

a computer for determining a combination of an orthogonal transform used for the transformation and an image analysis processing algorithm based on detection accuracy and resource information of the state detection apparatus, and for configuring the state detection apparatus according to the result of the determination, or for sending an instruction to configure the state detection apparatus according to the result of the determination.

16. A state detection apparatus comprising:

a sensor; and a processing apparatus coupled with the sensor and configured to execute data processing operations comprising transforming data of the digitized time-series signals of the sensor into data relating to spectral intensity comprising a spectral intensity vector for each of the digitized time-series signals;

generating a pseudo image based on the data relating to the spectral intensity by generating a two-dimensional image by arranging each spectral intensity vector as one or more rows in a vertical direction; and analyzing the pseudo image and outputting a classification result of a state of a facility based on the analysis of the pseudo image, wherein a width in pixels of the generated pseudo image is equal to a number of dimensions of the spectral intensity vector, wherein a vertical size of the pseudo image in a number of pixels is equal to a product of the sensor and a number of the one or more rows, and wherein a pixel value of the pseudo image is equivalent to a frequency spectral intensity of the digitized time-series signal of the sensor such that the pseudo image is independent of a phase of the digitized time-series signal.

17. The state detection apparatus according to claim 16, wherein the processing apparatus performs the transformation by discrete Fourier transform or fast Fourier transform.

18. The state detection apparatus according to claim 17, wherein the processing apparatus analyzes the pseudo image by a convolutional neural network.

19. The state detection apparatus according to claim 16, wherein the processing apparatus analyzes the pseudo image by a convolutional neural network.

* * * * *